United States Patent
Jeong

(10) Patent No.: US 8,654,915 B2
(45) Date of Patent: Feb. 18, 2014

(54) CONTROL SIGNAL RECEIVER AND COMMUNICATION DEVICE HAVING THE SAME

(75) Inventor: Jun-Young Jeong, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/471,934

(22) Filed: May 15, 2012

(65) Prior Publication Data

US 2012/0294391 A1 Nov. 22, 2012

(30) Foreign Application Priority Data

May 17, 2011 (KR) .................. 10-2011-0046373

(51) Int. Cl.
*H04L 7/00* (2006.01)
*H04L 27/38* (2006.01)
*H04J 3/06* (2006.01)

(52) U.S. Cl.
USPC ........... 375/366; 375/365; 375/364; 375/355; 375/316; 370/503; 370/509; 370/464; 370/480

(58) Field of Classification Search
USPC ......... 375/355, 354, 283, 279, 271, 259, 330, 375/322, 316; 370/516, 480, 464, 503
See application file for complete search history.

(56) References Cited

U.S. PATENT DOCUMENTS

| | | | |
|---|---|---|---|
| 4,349,914 A * | 9/1982 | Evans | 375/267 |
| 6,118,825 A | 9/2000 | Ikeda et al. | |
| 6,618,450 B1 | 9/2003 | Hatta | |
| 6,788,654 B1 * | 9/2004 | Hashimoto et al. | 370/321 |
| 2008/0152042 A1 * | 6/2008 | Adachi | 375/330 |
| 2009/0232264 A1 * | 9/2009 | Gu et al. | 375/371 |
| 2010/0202552 A1 * | 8/2010 | Sakai et al. | 375/267 |

FOREIGN PATENT DOCUMENTS

| | | |
|---|---|---|
| JP | 2000-165462 | 6/2000 |
| JP | 2006-033867 | 2/2006 |
| JP | 2007-214969 | 8/2007 |
| JP | 2008-160478 | 7/2008 |

* cited by examiner

*Primary Examiner* — Chieh M Fan
*Assistant Examiner* — Michelle M Koeth
(74) *Attorney, Agent, or Firm* — F. Chau & Associates, LLC

(57) ABSTRACT

A control signal receiver includes a converting circuit and a synchronization detection circuit. The converting circuit generates a complex control symbol stream including transmission configurations by converting an input signal. The synchronization detection circuit generates a first bit stream by applying a first determination criterion to the complex control symbol stream and generates a first synchronization signal by comparing the first bit stream with a reference synchronization word. The synchronization detection circuit generates a second bit stream by applying the first determination criterion and a second determination criterion to the complex control symbol stream in that order and generates a second synchronization signal by comparing the second bit stream with the reference synchronization word. The synchronization detection circuit outputs one of the first synchronization signal and the second synchronization signal as a synchronization enable signal. The control signal receiver effectively establishes frame synchronization.

16 Claims, 17 Drawing Sheets

| INDEX | I | Q |
|---|---|---|
| 0 | a0 | b0 |
| 1 | a1 | b1 |
| 2 | a2 | b2 |
| . | . | . |
| . | . | . |
| . | . | . |
| 203 | a203 | b203 |

CONTROL SIGNAL RECEIVER AND COMMUNICATION DEVICE HAVING THE SAME

CROSS-REFERENCE TO RELATED APPLICATION(S)

This application claims priority under 35 USC §119 of Korean Patent Application No. 10-2011-0046373, filed on May 17, 2011 in the Korean Intellectual Property Office (KIPO), the contents of which are herein incorporated by reference in their entirety.

TECHNICAL FIELD

Exemplary embodiments relate to a communication device, and more particularly to a control signal receiver for digital broadcasting systems and a communication device including the control signal receiver.

DESCRIPTION OF THE RELATED ART

Generally, digital broadcasting systems use a control signal to define transmission and multiplexing configurations.

The ISDB (Integrated Services Digital Broadcasting)-T system is a standard for digital television (DTV) and digital radio (DAB) used by countries in Asia and in South America. The core standards of ISDB are ISDB-S (satellite television), ISDB-T (terrestrial), ISDB-C (cable) and 2.6 GHz band mobile broadcasting which are all based on MPEG-2 or MPEG-4 standard for multiplexing with transport stream structure and video and audio coding (MPEG-2 or H.264), and are capable of high definition television (HDTV) and standard definition television. ISDB-T and ISDB-Tsb are for mobile reception in TV bands. 1seg is the name of an ISDB-T service for reception on cell phones, laptop computers and vehicles.

In the ISDB-T system, a TMCC (Transmission & Multiplexing Configuration Control) signal is used as the control signal and a receiver is required to decode the TMCC signal before decoding multimedia data. According to the ISDB-T standard, the frame synchronization may be established by detecting the synchronization word having sixteen bits included in the TMCC signal. The receiver for ISDB-T establishes frame synchronization by detecting the synchronization word included in the TMCC signal, and then decodes TMCC information included in the TMCC signal to achieve various parameters. In ISDB-T, the TMCC signal is transmitted by a relatively small number of carriers. Therefore, if a frequency response at a frequency of a carrier of the TMCC signal decreases in a fading channel, it is difficult for the receiver to detect synchronization words included in the TMCC signal.

SUMMARY

Some aspects of the invention provides a control signal receiver that is able to effectively establish frame synchronization despite noise in a fading transmission channel.

Some exemplary embodiments are directed to provide a communication device including the control signal receiver.

According to exemplary embodiments, a control signal receiver includes a converting circuit and a synchronization detection circuit.

The converting circuit generates a complex control symbol stream including transmission configurations by converting an input signal. The synchronization detection circuit generates a first bit stream by applying a first determination criterion to the complex control symbol stream and generates a first synchronization signal by comparing the first bit stream with a reference synchronization word. The synchronization detection circuit generates a second bit stream by applying the first determination criterion and a second determination criterion to the complex control symbol stream in that order and generates a second synchronization signal by comparing the second bit stream with the reference synchronization word. The synchronization detection circuit outputs one of the first synchronization signal and the second synchronization signal as a synchronization enable signal.

In exemplary embodiments, the synchronization detection circuit may comprise a first pattern detection block, a second pattern detection block and a synchronization decision block. The first pattern detection block may generate the first bit stream by converting the complex control symbol stream using the first determination criterion and generate the first synchronization signal by comparing the first bit stream with the reference synchronization word. The a second pattern detection block may generate a third bit stream by converting the complex control symbol stream using the first determination criterion and generate at least one error complex control symbol when the third bit stream does not include the reference synchronization word. The second pattern detection block may generate the second bit stream by applying the second determination criterion to the at least one error complex control symbol and generate the second synchronization signal by comparing the second bit stream with the reference synchronization word. The synchronization decision block may output one of the first synchronization signal and the second synchronization signal as the synchronization enable signal.

The second pattern detection block may comprise a first sub-detection block and a second sub-detection block. The first sub-detection block may generate the third bit stream by converting the complex control symbol stream using the first determination criterion, compare the third bit stream with the reference synchronization word bit by bit, and output the third bit stream and at least one complex control symbol among the complex control symbol stream, which corresponds to a bit of the third bit stream that does not coincide with the reference synchronization word, as the error complex control symbol. The second sub-detection block may generate the second bit stream by updating the third bit stream based on a result of converting the at least one error complex control symbol using the second determination criterion and generate the second synchronization signal by comparing the second bit stream with the reference synchronization word.

The synchronization decision block may output the first synchronization signal as the synchronization enable signal when the first synchronization signal is activated, and output the second synchronization signal as the synchronization enable signal when the first synchronization signal is deactivated.

The synchronization decision block may output the first synchronization signal as the synchronization enable signal during a first period having a length of M (M is a positive integer) frames, output the first synchronization signal as the synchronization enable signal after the first period when the first synchronization signal is activated during the first period, and output the second synchronization signal as the synchronization enable signal after the first period when the first synchronization signal is maintained in a deactivated state during the first period.

The synchronization detection circuit may further comprise an accumulating block configured to generate an accumulated complex control symbol stream by accumulating the complex control symbol stream for a plurality of frames in units of symbols and a multiplexer configured to provide one of the accumulated complex control symbol stream and the complex control symbol stream to the first pattern detection block and the second pattern detection block in response to a selection signal.

The selection signal may be activated when the synchronization enable signal is maintained in a deactivated state during N (N is a positive integer) frames. The multiplexer may provide the accumulated complex control symbol stream to the first pattern detection block and the second pattern detection block when the selection signal is activated and provide the complex control symbol stream to the first pattern detection block and the second pattern detection block when the selection signal is deactivated.

The reference synchronization word may be inverted in every frame. The accumulating block may generate the accumulated complex control symbol stream by inverting the accumulated complex control symbol stream and adding the complex control symbol stream to the inverted accumulated complex control symbol stream in every frame.

In exemplary embodiments, the first determination criterion may include a first area and a second area that do not overlap each other in a complex number plane, where a complex control symbol included in the complex control symbol stream may be converted into a bit of '1' when the complex control symbol is included in the first area and be converted into a bit of '0' when the complex control symbol is included in the second area.

In exemplary embodiments, the converting circuit may comprise a radio frequency (RF) receiving block, a converting block, a signal extracting block and a frequency adapting block. The RF receiving block may demodulate the input signal based on a current carrier frequency to generate a demodulated signal. The RF receiving block may adjust the current carrier frequency based on a frequency selection signal. The converting block may perform Fourier transform on the demodulated signal to generate a first complex symbol stream, and perform complex conjugate multiplication of two consecutive complex symbols included in the first complex symbol stream to generate a second complex symbol stream. The signal extracting block may extract the complex control symbol stream from the second complex symbol stream. The frequency adapting block may calculate magnitudes of frequency responses at frequencies of control carriers, which carry the transmission configurations, using the first complex symbol stream based on location information of the control carriers, and generate the frequency selection signal based on the calculated magnitudes of frequency responses at frequencies of the control carriers.

The frequency adapting block may provide the frequency selection signal to the RF receiving block when the synchronization enable signal is maintained in a deactivated state during N (N is a positive integer) frames.

The location information of the control carriers may include relative locations of the control carriers in a frequency domain in one of the first complex symbol stream.

In exemplary embodiments, the input signal may be an orthogonal frequency division multiplexing (OFDM) modulated signal, and each complex symbol included in the complex control symbol stream may be a differential binary phase shift keying (DBPSK) symbol.

In exemplary embodiments, the control signal receiver may further comprise a decoding circuit configured to generate a transmission configuration signal by decoding a control bit stream based on the synchronization enable signal. The synchronization detection circuit may provide one of the first bit stream and the second bit stream to the decoding circuit as the control bit stream.

According to exemplary embodiments, a communication device includes a converting circuit, a synchronization detection circuit, a decoding circuit and a data receiving circuit. The converting circuit generates a complex symbol stream by converting an input signal, and extracts a complex control symbol stream including transmission configurations from the complex symbol stream. The synchronization detection unit generates a first bit stream by applying a first determination criterion to the complex control symbol stream and generates a first synchronization signal by comparing the first bit stream with a reference synchronization word. The synchronization detection circuit generates a second bit stream by applying the first determination criterion and a second determination criterion to the complex control symbol stream in that order and generates a second synchronization signal by comparing the second bit stream with the reference synchronization word. The synchronization detection circuit outputs one of the first synchronization signal and the second synchronization signal as a synchronization enable signal. The synchronization detection circuit outputs one of the first bit stream and the second bit stream as the control bit stream. The decoding circuit generates a transmission configuration signal by decoding the control bit stream based on the synchronization enable signal. The data receiving circuit generates multimedia data by decoding the complex symbol stream based on the transmission configuration signal.

Various exemplary embodiments will be described more fully with reference to the accompanying drawings, in which some exemplary embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

BRIEF DESCRIPTION OF THE DRAWINGS

Illustrative, non-limiting exemplary embodiments will be more clearly understood from the following detailed description in conjunction with the accompanying drawings, wherein.

DETAILED DESCRIPTION OF THE EXEMPLARY EMBODIMENTS

Figure 1:
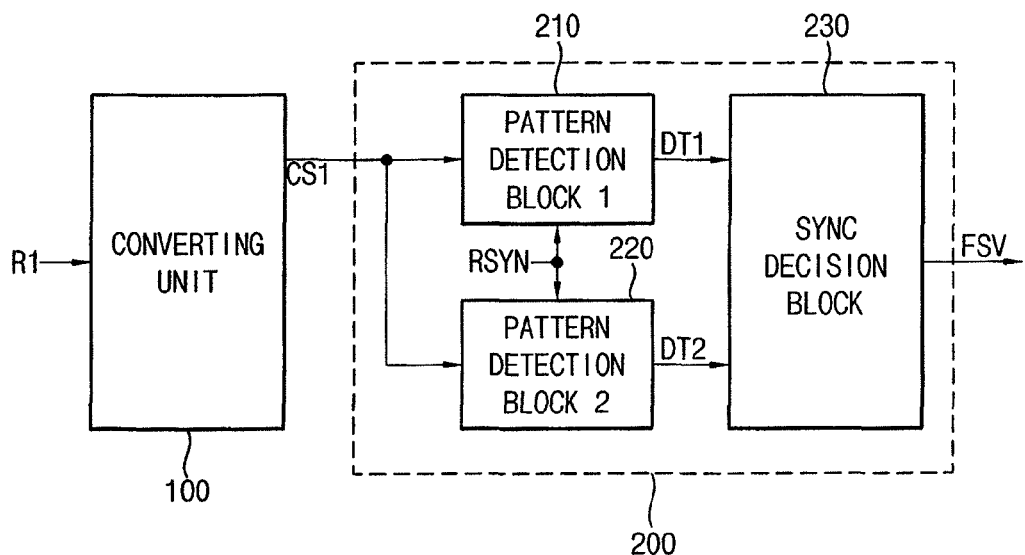
FIG. 1 is a block diagram of a control signal receiver according to exemplary embodiments.

FIG. 1 is a block diagram of a control signal receiver according to exemplary embodiments.

Referring to FIG. 1, a control signal receiver 10 includes a converting unit 100 and a synchronization detection unit 200.

The converting unit 100 receives an input signal R1 and converts the input signal R1 to generate a complex control symbol stream CS1 including transmission configurations.

The input signal R1 may be transmitted through a fading channel to the control signal receiver 10. The input signal R1 may be an orthogonal frequency division multiplexing (OFDM) modulated signal or a coded orthogonal frequency division multiplexing (COFDM) modulated signal. For example, the input signal R1 may be a digital broadcasting signal according to ISDB (Integrated Services Digital Broadcasting)-T, ISDB-T 1seg, ISDB-T TSB, etc.

The converting unit 100 may generate a complex symbol stream including a plurality of complex symbols by performing operations, such as a fast Fourier transform (FFT) operation, upon the input signal R1, and extract complex symbols corresponding to a control signal from the complex symbol stream to generate the complex control symbol stream CS1. The control signal may be a TMCC (Transmission & Multiplexing Configuration Control) signal according to a ISDB-T standard. The TMCC signal may include the transmission configurations such as a modulation type, a code rate, a time interleaving parameter, etc. The TMCC signal may include two hundred and four bits. Sixteen bits of the TMCC signal is a synchronization word used for establishing frame synchronization, and one hundred and two bits of the TMCC signal is a TMCC information including the transmission configurations.

Each complex control symbol of the complex control symbol stream CS1 may be modulated by various kinds of modulation methods. For example, if the input signal R1 is a digital broadcasting signal according to ISDB-T, each complex control symbol of the complex control symbol stream CS1 may be a differential binary phase shift keying (DBPSK) symbol.

Hereinafter, for ease of explanation, it is assumed that the input signal R1 is an OFDM modulated signal, that the control signal is the TMCC signal, and that each complex control symbol of the complex control symbol stream CS1 is a DBPSK symbol. However, embodiments are not limited thereto.

The synchronization detection unit 200 generates a synchronization enable signal FSV based on the complex control symbol stream CS1, a first determination criterion and a second determination criterion. The synchronization enable signal FSV represents whether frame synchronization is established or not. For example, the synchronization detection unit 200 may activate the synchronization enable signal FSV when (while) the synchronization detection unit 200 establishes frame synchronization.

The first determination criterion and the second determination criterion will be described later with reference to FIGS. 4 and 5.

The synchronization detection unit 200 generates a first bit stream by applying the first determination criterion to the complex control symbol stream CS1 and generates a first synchronization signal DT1 by comparing the first bit stream with a reference synchronization word RSYN bit by bit. The reference synchronization word RSYN may be a predetermined synchronization word included in the TMCC signal according to the ISDB-T standard.

The synchronization detection unit 200 generates a second bit stream by applying the first determination criterion and the second determination criterion to the complex control symbol stream CS1 in that order and generates a second synchronization signal DT2 by comparing the second bit stream with the reference synchronization word RSYN bit by bit.

The synchronization detection unit 200 selects and outputs the selected one of the first synchronization signal DT1 and the second synchronization signal DT2 as the synchronization enable signal FSV.

In some exemplary embodiments, as will be described with reference to FIG. 6, the synchronization detection unit 200 generates the first synchronization signal DT1 and the second synchronization signal DT2 using an accumulated complex control symbol stream ACS that is generated by accumulating the complex control symbol stream CS1 in units of symbols for a plurality of frames.

The synchronization detection unit 200 includes a first pattern detection block 210, a second pattern detection block 220 and a synchronization decision block 230.

The first pattern detection block 210 generates the first bit stream by converting the complex control symbol stream CS1 using the first determination criterion and generates the first synchronization signal DT1 by comparing the first bit stream with the reference synchronization word RSYN. For example, when the reference synchronization word RSYN is '0011010111101110' and the first bit stream includes '0010010011101110', the first pattern detection block 210 may generate the first synchronization signal DT1 in a deactivated state since the fourth bit and the eighth bit of the first bit stream does not coincide with the reference synchronization word RSYN. Alternatively, when the reference synchronization word RSYN is '0011010111101110' and the first bit stream includes '0011010111101110', the first pattern detection block 210 may generate the first synchronization signal DT1 in an activated state since the first bit stream includes the entire reference synchronization word RSYN.

The second pattern detection block 220 generate the second bit stream by converting the complex control symbol stream CS1 using the first determination criterion and the second determination criterion in that order. The second pattern detection block 220 generates a third bit stream by converting the complex control symbol stream CS1 using the first determination criterion and generates at least one error complex control symbol ER when the third bit stream does not include the reference synchronization word RSYN. The at least one error complex control symbol ER may be a complex control symbol among the complex control symbol stream CS1, which corresponds to the bit(s) of the third bit stream that do(es) not coincide with the reference synchronization word RSYN. For example, when the reference synchronization word RSYN is '0011010111101110' and the third bit stream includes '0010010011101110', the second pattern detection block 220 may output two complex control symbols ER among the complex control symbol stream CS1, which correspond to the fourth bit and the eighth bit of the third bit stream, as the at least one error complex control symbol ER since the fourth bit and the eighth bit of the third bit stream does not coincide with the reference synchronization word RSYN.

The number of error complex control symbols ER may be the number of bits among the third bit stream that does not coincide with the reference synchronization word RSYN. For example, when the reference synchronization word RSYN has sixteen bits according to the ISDB-T standard and fourteen symbols among the complex control symbol stream CS1 are determined (according to the first determination criterion) to correspond to the reference synchronization word RSYN, the number of error complex control symbols ER is two.

The second pattern detection block 220 generates the second bit stream by applying the second determination criterion to the at least one error complex control symbol ER. In some exemplary embodiments, the second pattern detection block 220 generates the second bit stream by updating the third bit stream based on a result of converting the at least one error complex control symbol ER using the second determination criterion. The second pattern detection block 220 generates the second synchronization signal DT2 by comparing the second bit stream with the reference synchronization word RSYN. For example, when the reference synchronization word RSYN is '0011010111101110' and the second bit stream includes '0011010011101110', the second pattern detection block 220 generate the second synchronization signal DT2 in a deactivated state since the eighth bit of the second bit stream does not coincide with the reference synchronization word RSYN. Alternatively, when the reference synchronization word RSYN is '0011010111101110' and the second bit stream includes '0011010111101110', the second pattern detection block 220 generates the second synchronization signal DT2 in an activated state since the second bit stream includes the entire reference synchronization word RSYN.

In some exemplary embodiments, the second pattern detection block 220 generates the second synchronization signal DT2 by performing the above described operations only if the number of error complex control symbol(s) ER is equal to or less than K (K is a positive integer) and generates the second synchronization signal DT2 in a deactivated state if the number of error complex control symbol(s) ER is greater than K.

Figure 2:
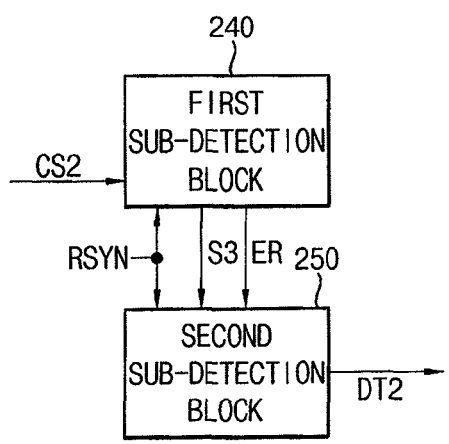
FIG. 2 is a block diagram of an example of a second pattern detection block included in the control signal receiver of FIG. 1.

FIG. 2 is a block diagram of an example of the second pattern detection block included in the control signal receiver of FIG. 1.

Referring to FIG. 2, the second pattern detection block 220 may include a first sub-detection block 240 and a second sub-detection block 250.

The first sub-detection block 240 generates the third bit stream S3 by converting the complex control symbol stream CS1 using the first determination criterion, compare the third bit stream S3 with the reference synchronization word RSYN bit by bit. The first sub-detection block 240 outputs the third bit stream S3 and at least one complex control symbol among the complex control symbol stream CS1, which corresponds to a bit of the third bit stream S3 that does not coincide with the reference synchronization word RSYN, as the at least one error complex control symbol ER. For example, when the reference synchronization word RSYN is '0011010111101110' and the third bit stream S3 includes '0010010011101110', the first sub-detection block 240 outputs two complex control symbols among the complex control symbol stream CS1, which correspond to the fourth bit and the eighth bit of the third bit stream S3, as the at least one error complex control symbol ER since the fourth bit and the eighth bit of the third bit stream S3 do not coincide with the reference synchronization word RSYN.

The second sub-detection block 250 generates the second synchronization signal DT2 in a deactivated state if the number of the at least one error complex control symbol is greater than K. If the number of error complex control symbols ER is equal to or less than K, the second sub-detection block 250 generates the second bit stream by updating the third bit stream S3 based on the result of converting the at least one error complex control symbol ER using the second determination criterion. As will be described later with reference to FIGS. 4 and 5, the second determination criterion is more relaxed than the first determination criterion in converting a complex control symbol into one bit. The second sub-detection block 250 generates the second synchronization signal DT2 by comparing the second bit stream with the reference synchronization word RSYN.

The number of error complex control symbol(s) ER represents the number of bits among the third bit stream that do not coincide with the reference synchronization word RSYN. For example, when the reference synchronization word RSYN has sixteen bits according to the ISDB-T standard and fourteen symbols among the complex control symbol stream CS1 are determined (by the first determination criterion) to correspond to the reference synchronization word RSYN, the number of error complex control symbol(s) ER is two.

Hereinafter, the first determination criterion and the second determination criterion will be described with reference to FIGS. 4 and 5.

Figure 4:
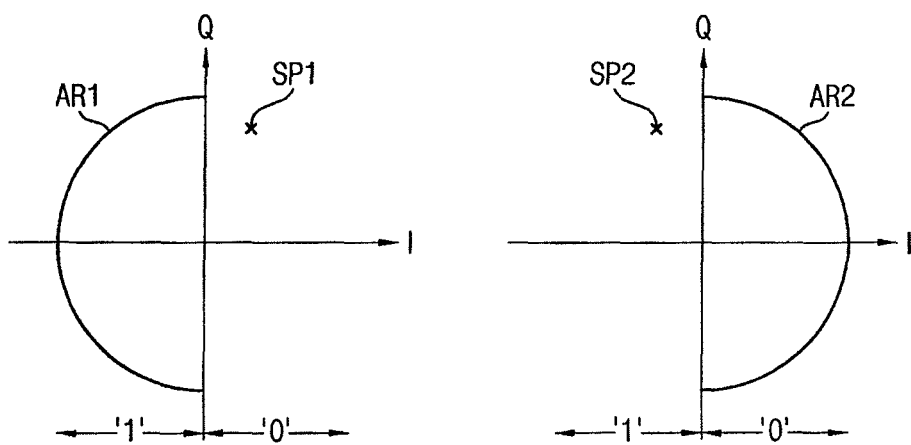
FIG. 4 is a graph for describing a first determination criterion used by a synchronization detection unit of a control signal receiver of FIG. 1.

FIG. 4 is a graph for describing the first determination criterion used by the synchronization detection unit of the control signal receiver of FIG. 1. FIG. 5 is a diagram for describing the second determination criterion used by the synchronization detection unit of the control signal receiver of FIG. 1.

As described above, the synchronization detection unit 200 converts one of the complex control symbol stream CS1 into one bit using the first determination criterion and the second determination criterion.

Figure 5:
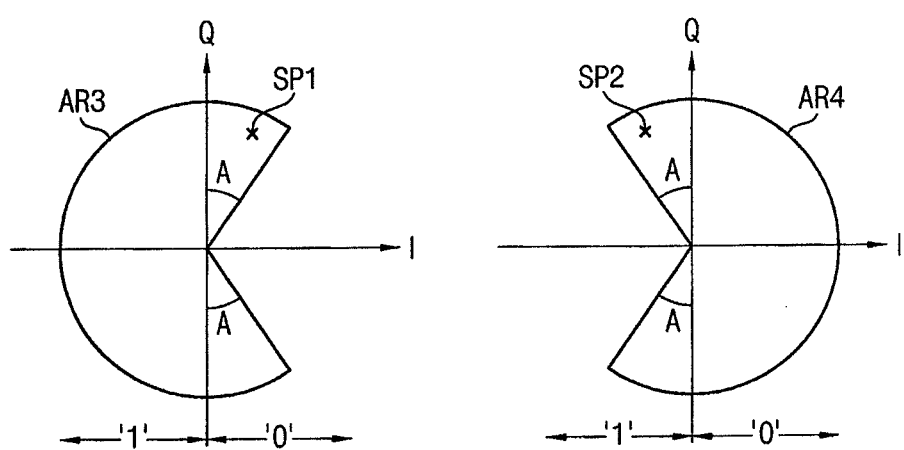
FIG. 5 is a graph for describing the second determination criterion used by the synchronization detection unit of the control signal receiver of FIG. 1.

In FIGS. 4 and 5, complex control symbols SP1 and SP2 may be a binary phase shift keying (BPSK) symbol or a DBPSK symbol. In FIGS. 4 and 5, I and Q correspond to an in-phase channel and a quadrature phase channel of a complex control symbol in a complex number plane. In FIGS. 4 and 5, the first complex control symbol SP1 corresponds to the bit of '1', and a second complex control symbol SP2 corresponds to the bit of '0'.

Referring to FIG. 4, the first determination criterion includes a first area AR1 and a second area AR1 in a complex number plane. As described above, the first pattern detection block 210 converts the complex control symbol stream CS1 into one bit using the first determination criterion. For example, the first pattern detection block 210 converts a complex control symbol into a bit of '1' when the complex control symbol is included in the first area AR1 in the complex number plane, and converts the complex control symbol into a bit of '0' when the complex control symbol is included in the second area AR2 in the complex number plane. The first area AR1 and the second area AR2 do not overlap each other in the complex number plane. Thus, the first area AR1 has an area having a central angle ranging from +90 degrees to +270 degrees in the complex number plane, and the second area AR2 has an area having a central angle ranging from −90 degrees to +90 degrees in the complex number plane.

The first pattern detection block 210 may convert the first complex control symbol SP1 into a bit of '0' even though the first complex control symbol SP1 really corresponds to a bit of '1' if the first complex control symbol SP1 is detected in the second area AR2 in the complex number plane due to noise in the transmission channel. The first pattern detection block 210 may convert the second complex control symbol SP2 into a bit of '1' even though the second complex control symbol SP2 really corresponds to a bit of '0' if the second complex control symbol SP2 is detected in the first area AR1 in the complex number plane due to noise in the transmission channel.

Referring to FIG. 5, the second determination criterion includes a third area AR3 and a fourth area AR4 in the complex number plane. As described above, the second sub-detection block 250 included in the second pattern detection block 220 convert one of the at least one error complex control symbol ER into one bit using the second determination criterion. For example, the second sub-detection block 250 converts an error complex control symbol ER into a bit of '1' when the error complex control symbol is detected in the third area AR3 in the complex number plane, and converts the error complex control symbol into a bit of '0' when the error complex control symbol is detected in the fourth area AR4 in the complex number plane. The third area AR3 and the fourth area AR4 overlap each other in the complex number plane. Thus, the third area AR3 include an area having a central angle ranging from (90−A) degrees to (270+A) degrees in the complex plane, and the fourth area AR4 include an area having a central angle ranging from −(90+A) degrees to (90+A) degrees in the complex plane, where A is a positive number smaller than 90.

When the second sub-detection block 250 uses the third area AR3 for converting an error complex control symbol into one bit, the second sub-detection block 250 converts the error complex control symbol into a bit of '1' when the error complex control symbol is detected in the third area AR3 in the complex number plane, and converts the error complex control symbol into a bit of '0' when the error complex control symbol is not detected in the third area AR3 in the complex number plane. Alternatively, when the second sub-detection block 250 uses the fourth area AR4 for converting an error complex control symbol ER into one bit, the second sub-detection block 250 converts the error complex control symbol into a bit of '0' when the error complex control symbol is detected in the fourth area AR4 in the complex number plane, and converts the error complex control symbol into a bit of '1' when the error complex control symbol is not detected in the fourth area AR4 in the complex number plane. Therefore, the second sub-detection block 250 convert an error complex control symbol ER into one of a bit of '1' and a bit of '0' according to which area selected among the third area AR3 and the fourth area AR4 is used when the error complex control symbol is included in an overlapping area of the third area AR3 and the fourth area AR4.

The second sub-detection block 250 may use the third area AR3 to convert an error complex control symbol into one bit when the first sub-detection block 240 converted the error complex control symbol into a bit of '0' using the first determination criterion. Alternatively, the second sub-detection block 250 may use the fourth area AR4 to convert the error complex control symbol into one bit when the first sub-detection block 240 converted the error complex control symbol into a bit of '1' using the first determination criterion.

Therefore, the first sub-detection block 240 may convert the first complex control symbol SP1 into a bit of '0' although the first complex control symbol SP1 really corresponds to a bit of '1' if the first complex control symbol SP1 is detected in the second area AR2 in the complex number plane due to noise in the transmission channel, and the first sub-detection block 240 may provide first complex control symbol SP1 to the second sub-detection block 250 as the error complex control symbol. However, the second sub-detection block 250 may convert the first complex control symbol SP1 into a bit of '1' if the first complex control symbol SP1 is detected in the third area AR3.

Alternatively, the first sub-detection block 240 may convert the second complex control symbol SP2 into a bit of '1' although the second complex control symbol SP2 really corresponds to a bit of '0' if the second complex control symbol SP2 is located in the first area AR1 in the complex number plane due to noise in a transmission channel, and the first sub-detection block 240 may provide second complex control symbol SP2 to the second sub-detection block 250 as the error complex control symbol. However, the second sub-detection block 250 may convert the second complex control symbol SP2 into a bit of '0' since the second complex control symbol SP2 is located in the fourth area AR4.

Referring again to FIG. 1, the synchronization decision block 230 selects and outputs one of the first synchronization signal DT1 and the second synchronization signal DT2 as the synchronization enable signal FSV.

In some exemplary embodiments, the synchronization decision block 230 outputs the first synchronization signal DT1 as the synchronization enable signal FSV when the first synchronization signal DT1 is activated, and outputs the second synchronization signal DT2 as the synchronization enable signal FSV when the first synchronization signal DT1 is deactivated.

In other exemplary embodiments, the synchronization decision block 230 outputs the first synchronization signal DT1 as the synchronization enable signal FSV during a first period having a length of M (M is a positive integer) frames. The synchronization decision block 230 may output the first synchronization signal DT1 as the synchronization enable signal FSV after the first period when the first synchronization signal DT1 is activated during the first period, and output the second synchronization signal DT2 as the synchronization enable signal FSV after the first period when the first synchronization signal DT1 is maintained in a deactivated state during the first period.

The synchronization enable signal FSV is a synchronism detection signal represents whether frame synchronization is established or not. The synchronization detection unit 200 activates the synchronization enable signal FSV when the synchronization detection unit 200 establishes frame synchronization. For example, the synchronization detection unit 200 activates the synchronization enable signal FSV when the synchronization detection unit 200 detects the synchronization word included in the TMCC signal from the complex control symbol stream CS1.

Generally, a receiver for ISDB-T establishes frame synchronization using the TMCC signal, and then decodes the TMCC signal to achieve transmission and multiplexing configurations. After that, the receiver decodes multimedia data using the transmission and multiplexing configurations. According to the ISDB-T standard, the frame synchronization may be established by detecting the synchronization word having sixteen bits included in the TMCC signal. In ISDB-T, the TMCC signal is transmitted by a relatively small number of carriers. Therefore, if a frequency response at a frequency of a carrier of the TMCC signal decreases in a fading channel, it is difficult for the receiver to detect the synchronization word included in the TMCC signal.

As described above, the control signal receiver 10 according to exemplary embodiments detects the synchronization word from the complex control symbol stream CS1 using the first determination criterion and the second determination criterion. Therefore, the control signal receiver 10 may effectively detect the synchronization word even in a fading channel.

Figure 3:
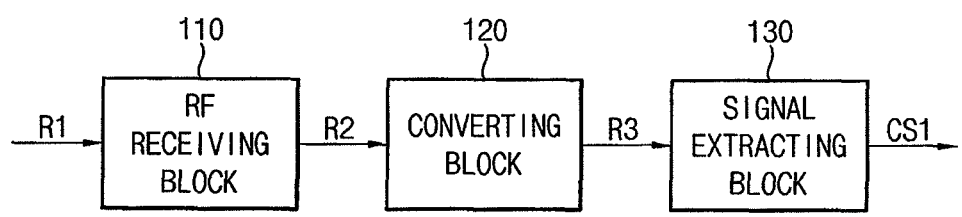
FIG. 3 is a block diagram of an example of a converting unit included in the control signal receiver of FIG. 1.

FIG. 3 is a block diagram of an example of the converting unit included in the control signal receiver of FIG. 1.

Referring to FIG. 3, the converting unit 100 includes a radio frequency (RF) receiving block 110, a converting block 120 and a signal extracting block 130.

The RF receiving block 110 receives the input signal R1. The RF receiving block 110 demodulates the input signal R1 based on a current carrier frequency to generate a demodulated signal R2.

According to the ISDB-T standard, an ISDB-T system may include a plurality of channels. Each channel of an ISDB-T system may be divided into thirteen OFDM segments. Each of the thirteen OFDM segments may have 428 kHz of bandwidth. The current carrier frequency may correspond to one of the thirteen OFDM segments.

The converting block 120 perform a Fourier transform on the demodulated signal R2 to generate a first complex symbol stream, and perform complex conjugate multiplication of two consecutive complex symbols included in the first complex symbol stream to generate a second complex symbol stream R3. When the input signal R1 is an OFDM modulated signal, the first complex symbol stream may include OFDM symbols, and the second complex symbol stream R3 may include DBPSK symbols according to the ISDB-T standard.

The signal extracting block 130 extracts the complex control symbol stream CS1 from the second complex symbol stream R3, and provides the complex control symbol stream CS1 to the synchronization detection unit 200 of FIG. 1. The complex control symbol stream CS1 may include transmission configurations. For example, the complex control symbol stream CS1 may include the TMCC signal.

Figure 6:
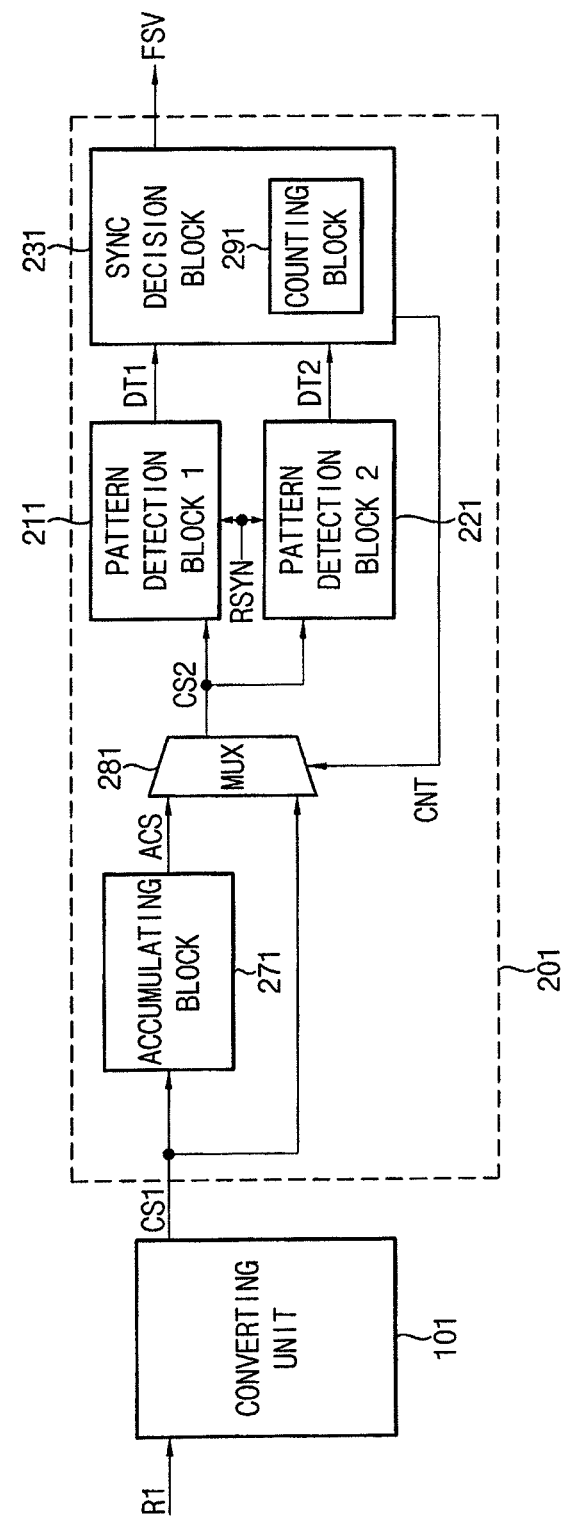
FIG. 6 is a block diagram of a control signal receiver according to exemplary embodiments.
Figures 7, 8:
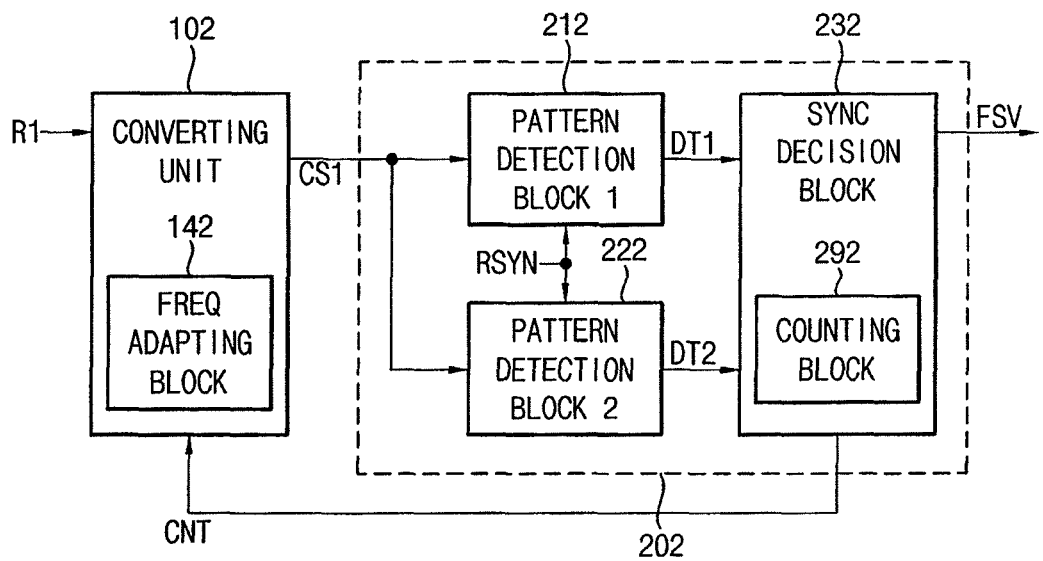
FIG. 7 is a table illustrating an example of a complex control symbol set included in an accumulating block 271 of FIG. 6.
FIG. 8 is a block diagram of a control signal receiver according to exemplary embodiments.

FIG. 6 is a block diagram of a control signal receiver 11 according to exemplary embodiments. FIG. 7 is a diagram illustrating an example of a complex control symbol table included in an accumulating block 271 of FIG. 6.

Referring to FIG. 6, a control signal receiver 11 includes a converting unit 101 and a synchronization detection unit 201.

The converting unit 101 of FIG. 6 may have the same structure and operation as the converting unit 100 of FIG. 1. The structure and operation of the converting unit 101 (100) are described above with reference to FIGS. 1 to 5. Therefore, a redundant detailed description of the converting unit 101 of FIG. 6 will be omitted.

The synchronization detection unit 201 includes a first pattern detection block 211, a second pattern detection block 221, a synchronization decision block 231, an accumulating block 271 and a multiplexer 281.

The accumulating block 271 generates an accumulated complex control symbol stream ACS by accumulating the complex control symbol stream CS1 for a plurality of frames in units of symbols. The accumulating block 271 may include a complex control symbol table and may store the accumulated complex control symbol stream ACS in the complex symbol table.

Referring to FIG. 7, the complex control symbol table may include an index column, an in-phase column I and a quadrature-phase column Q.

A plurality of symbols may be included in each frame. For example, two hundred and four OFDM symbols may be included in each frame in the ISDB-T system, and each OFDM symbol may include one bit of the TMCC signal. Therefore, the accumulating block 271 may receive two hundred and four complex control symbols, which are converted from the OFDM symbols, in a frame.

Each row of the complex control symbol table may correspond to one complex control symbol included in a frame.

The index column may store a serial number of a corresponding complex control symbol.

The accumulating block 271 may accumulate an in-phase value (that is, a "real" part) of a complex control symbol that has had the same serial number for a plurality of frames, and accumulate a quadrature-phase value (that is, an "imaginary" part) of a complex control symbol that has had the same serial number for a plurality of frames.

The in-phase column I stores the accumulated in-phase value $a0, a1, a2, \ldots, a203$ in a corresponding row. The quadrature-phase column Q stores the accumulated quadrature-phase value $b0, b1, b2, \ldots, b203$ in a corresponding row.

Referring again to FIG. 6, the multiplexer 281 provides a selected one of the accumulated complex control symbol stream ACS and the complex control symbol stream CS1 to the first pattern detection block 211 and to the second pattern detection block 221 as a selected complex control symbol stream CS2 in response to an inner signal CNT. The inner signal CNT may be generated by the synchronization decision block 231.

The first pattern detection block 211 and the second pattern detection block 221 of FIG. 6 may have the same structure and operation as the first pattern detection block 210 and the second pattern detection block 220 of FIG. 1, respectively, except that the first pattern detection block 211 and the second pattern detection block 221 receives the selected complex control symbol stream CS2 from the multiplexer 281 instead of receiving the complex control symbol stream CS1 directly from the converting unit 101. The structure and operation of the first pattern detection block 210 and the second pattern detection block 220 are described above with reference to FIGS. 1 to 5. Therefore, a redundant detailed description of the first pattern detection block 211 and the second pattern detection block 221 of FIG. 6 will be omitted.

According to the ISDB-T standard, the synchronization word included in the TMCC signal may be inverted in every frame. Therefore, the accumulating block 271 may generate the accumulated complex control symbol stream ACS by inverting the accumulated complex control symbol stream ACS and adding the complex control symbol stream CS1 to the inverted accumulated complex control symbol stream in every frame. In this case, the reference synchronization word RSYN provided to the first pattern detection block 211 and the second pattern detection block 221 may be inverted in every frame.

The synchronization decision block 231 may output one among the first synchronization signal DT1 received from the first pattern detection block 211 and the second synchronization signal DT2 received from the second pattern detection block 221 as the synchronization enable signal FSV. The synchronization decision block 231 includes a counting block 291. The counting block 291 counts the number of frames during which the synchronization enable signal FSV is maintained in a deactivated state. The synchronization decision block 231 activates or deactivates the inner signal CNT based on the output of the counting block 291. For example, the synchronization decision block 231 may activate the inner signal CNT when the synchronization enable signal FSV is maintained in a deactivated state during N (N is a positive integer) frames. The synchronization decision block 231 may provide the inner signal CNT to the multiplexer 281.

The multiplexer 281 may provide the accumulated complex control symbol stream ACS to the first pattern detection block 211 and the second pattern detection block 221 when the inner signal CNT is activated and provide the complex control symbol stream CS1 to the first pattern detection block 211 and the second pattern detection block 221 when the inner signal CNT is deactivated.

FIG. 8 is a block diagram of a control signal receiver according to exemplary embodiments.

Referring to FIG. 8, a control signal receiver 12 includes a converting unit 102 and a synchronization detection unit 202.

The converting unit 102 receives the input signal R1 and generates the complex control symbol stream CS1 including the transmission configurations by converting the input signal R1 based on the current carrier frequency. The converting unit 102 adjusts the current carrier frequency based on a frequency selection signal. The converting unit 102 includes a frequency adapting block 142 that generates the frequency selection signal.

The converting unit 102 will be described later with reference to FIG. 9.

The synchronization detection unit 202 includes a first pattern detection block 212, a second pattern detection block 222 and a synchronization decision block 232.

The first pattern detection block 212 and the second pattern detection block 222 of FIG. 8 may have the same structure and operation as the first pattern detection block 210 and the second pattern detection block 220 of FIG. 1, respectively. The structure and operation of the first pattern detection block 210 and the second pattern detection block 220 are described above with reference to FIGS. 1 to 5. Therefore, a redundant detailed description of the first pattern detection block 212 and the second pattern detection block 222 of FIG. 8 will be omitted.

The synchronization decision block 232 outputs one of the first synchronization signal DT1 received from the first pattern detection block 212 and the second synchronization signal DT2 received from the second pattern detection block 222 as the synchronization enable signal FSV. The synchronization decision block 232 includes a counting block 292. The counting block 292 counts the number of frames during which the synchronization enable signal FSV is maintained in a deactivated state. The synchronization decision block 232 activates or deactivates the inner signal CNT based on the output of the counting block 292. For example, the synchronization decision block 232 activates the inner signal CNT when the synchronization enable signal FSV is maintained in a deactivated state during N frames. The synchronization decision block 232 provides the inner signal CNT to the frequency adapting block 142.

Figure 9:
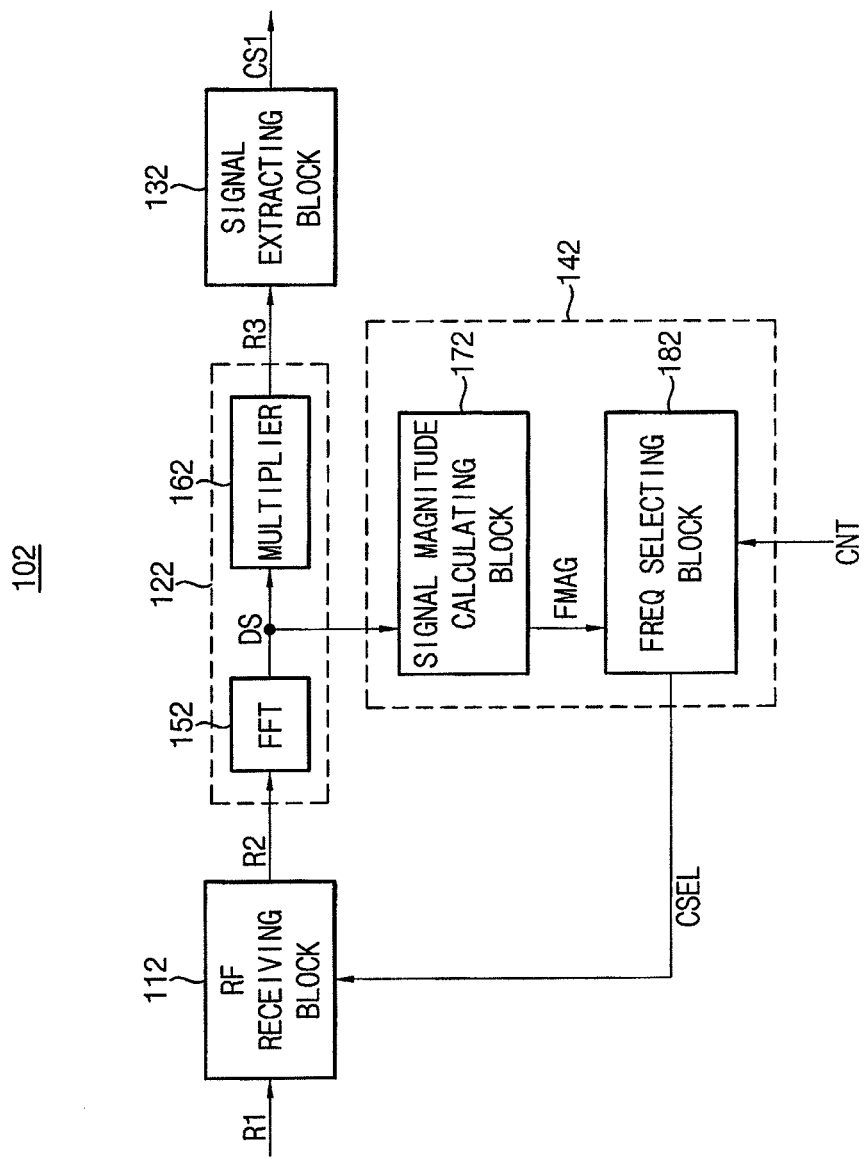
FIG. 9 is a block diagram of an example of the converting unit included in the control signal receiver of FIG. 8.

FIG. 9 is a block diagram of an example of the converting unit included in the control signal receiver of FIG. 8.

Referring to FIG. 9, the converting unit 102 includes a RF receiving block 112, a converting block 122, a signal extracting block 132 and the frequency adapting block 142.

The RF receiving block 112 receives the input signal R1. The RF receiving block 112 demodulates the input signal R1 based on the current carrier frequency to generate the demodulated signal R2.

According to the ISDB-T standard, ISDB-T system included a plurality of channels. Each channel of ISDB-T system may be divided into thirteen OFDM segments. Each of the thirteen OFDM segments may have 428 kHz of bandwidth. The current carrier frequency may correspond to one of the thirteen OFDM segments.

The converting block 122 may include a fast Fourier transformer (FFT) 152 and a complex multiplier 162. The fast Fourier transformer 152 performs a fast Fourier transform (FFT) on the demodulated signal R2 to generate the first complex symbol stream DS. The complex multiplier 162 performs complex conjugate multiplication of two consecutive complex symbols included in the first complex symbol stream DS to generate the second complex symbol stream R3. When the input signal R1 is an OFDM modulated signal, the first complex symbol stream DS may include OFDM symbols, and the second complex symbol stream R3 may include DBPSK symbols according to the ISDB-T standard.

The signal extracting block 132 extracts the complex control symbol stream CS1 from the second complex symbol stream R3. The complex control symbol stream CS1 may include transmission configurations. For example, the complex control symbol stream CS1 may include the TMCC signal.

The frequency adapting block 142 includes a signal magnitude calculating block 172 and a frequency selecting block 182.

The signal magnitude calculating block 172 calculates magnitudes of frequency responses FMAG at frequencies of control carriers that carry the transmission configurations, using the first complex symbol stream DS based on location information of the control carriers. For example, the control carriers may carry the TMCC signal. According to the ISDB-T standard, ISDB-T system may include a plurality of channels. Each channel of ISDB-T system may be divided into thirteen OFDM segments. Each of the thirteen OFDM segments may have a control carrier that carries the TMCC signal. The location information of the control carriers may include relative locations of the control carriers in a frequency domain in one of the first complex symbol stream. For example, the location information of the control carriers may include the relative locations of the control carriers in a frequency domain among carriers included in an OFDM segment. Therefore, the signal magnitude calculating block 172 may calculate magnitudes of frequency responses FMAG at frequencies of the control carriers of OFDM segments based on the location information of the control carriers.

The frequency selecting block 182 selects a frequency of the control carrier having a maximum magnitude of the frequency response. The frequency selecting block 182 generates the frequency selection signal CSEL based on the selected frequency of a control carrier. The frequency selecting block 182 provides the frequency selection signal CSEL to the RF receiving block 112 in response to the inner signal CNT received from the synchronization decision block 232. For example, the frequency selecting block 182 provides the frequency selection signal CSEL to the RF receiving block 112 when the inner signal CNT is activated. As described above, the synchronization decision block 232 may activate the inner signal CNT when the synchronization enable signal FSV is maintained in a deactivated state during N frames. Therefore, the frequency selecting block 182 may provide the frequency selection signal CSEL to the RF receiving block 112 when the synchronization enable signal FSV is maintained in a deactivated state during N frames.

The RF receiving block 112 may adjust the current carrier frequency based on the frequency selection signal CSEL, so that the adjusted current carrier frequency may correspond to another OFDM segment. Therefore, the control signal receiver 12 may detect the synchronization word included in the TMCC signal and decode the TMCC information included in the TMCC signal correctly despite noise in the transmission channel.

Figure 10:
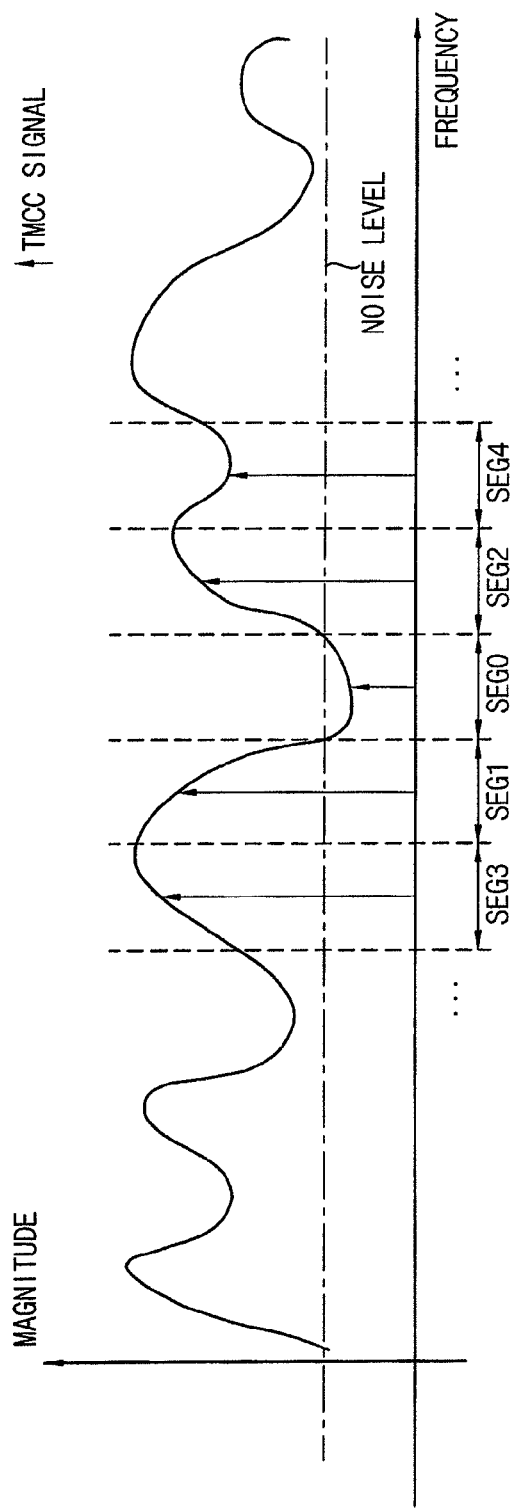
FIG. 10 is a graph illustrating an exemplary frequency response of a fading channel.

FIG. 10 is a graph illustrating an exemplary frequency response of a fading channel.

According to the ISDB-T standard, ISDB-T system may include a plurality of channels. Each channel of ISDB-T system may be divided into thirteen OFDM segments. Each of the thirteen OFDM segments may have 428 kHz of bandwidth. Each of the thirteen OFDM segments may have a control carrier that carries the TMCC signal.

Referring to FIG. 10, the TMCC signal is included in each OFDM segment SEG0, SEG1, SEG2, SEG3, SEG4. Since the TMCC signal is transmitted through a fading channel, a magnitude of a control carrier carrying the TMCC signal may be smaller than the noise level in a faded OFDM segment SEG0. When a control signal receiver uses the TMCC signal converted from the faded OFDM segment SEG0 in establishing frame synchronization, it may be difficult to detect the synchronization word included in the TMCC signal correctly because of noise in the transmission channel, and/or it may take an unacceptably long time to establish frame synchronization. However, the control signal receiver 10, 11, 12 according to exemplary embodiments may adjust the current carrier frequency so that the control signal receiver 10, 11, 12 may use the TMCC signal carried by a control carrier having a maximum magnitude of frequency response among the control carriers of the OFDM segments. Therefore, the control signal receiver 10, 11, 12 may be able to effectively and rapidly establish frame synchronization by detecting the synchronization word from the TMCC signal correctly even in a fading channel.

Figure 11:
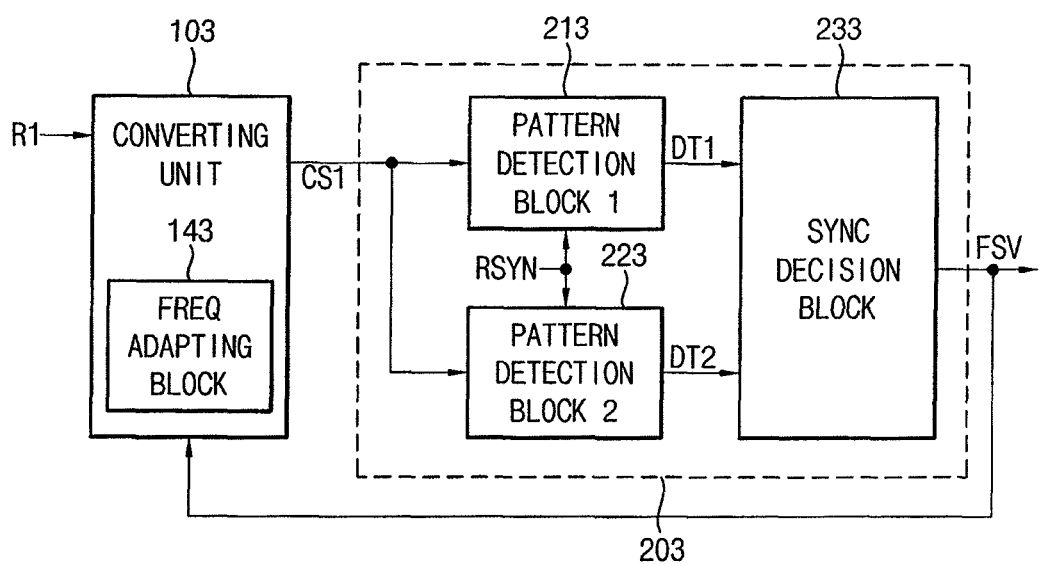
FIG. 11 is a block diagram of a control signal receiver according to exemplary embodiments.

FIG. 11 is a block diagram of a control signal receiver according to exemplary embodiments.

Referring to FIG. 11, a control signal receiver 13 includes a converting unit 103 and a synchronization detection unit 203.

The converting unit 103 receives the input signal R1 and generates the complex control symbol stream CS1 including the transmission configurations by converting the input signal R1 based on the current carrier frequency. The converting unit 103 adjusts the current carrier frequency based on a frequency selection signal. The converting unit 103 includes a frequency adapting block 143 that generates the frequency selection signal.

The converting unit 103 will be described later with reference to FIG. 12.

The synchronization detection unit 203 includes a first pattern detection block 213, a second pattern detection block 223 and a synchronization decision block 233.

The first pattern detection block 213 and the second pattern detection block 223 of FIG. 11 may have the same structure and operation as the first pattern detection block 210 and the second pattern detection block 220 of FIG. 1, respectively. The structure and operation of the first pattern detection block 210 and the second pattern detection block 220 are described above with reference to FIGS. 1 to 5. Therefore, a redundant detailed description of the first pattern detection block 213 and the second pattern detection block 223 of FIG. 11 will be omitted.

The synchronization decision block 233 outputs one of the first synchronization signal DT1 received from the first pattern detection block 213 and the second synchronization signal DT2 received from the second pattern detection block 223 as the synchronization enable signal FSV. The synchronization decision block 233 provides the synchronization enable signal FSV to the frequency adapting block 143.

Figure 12:
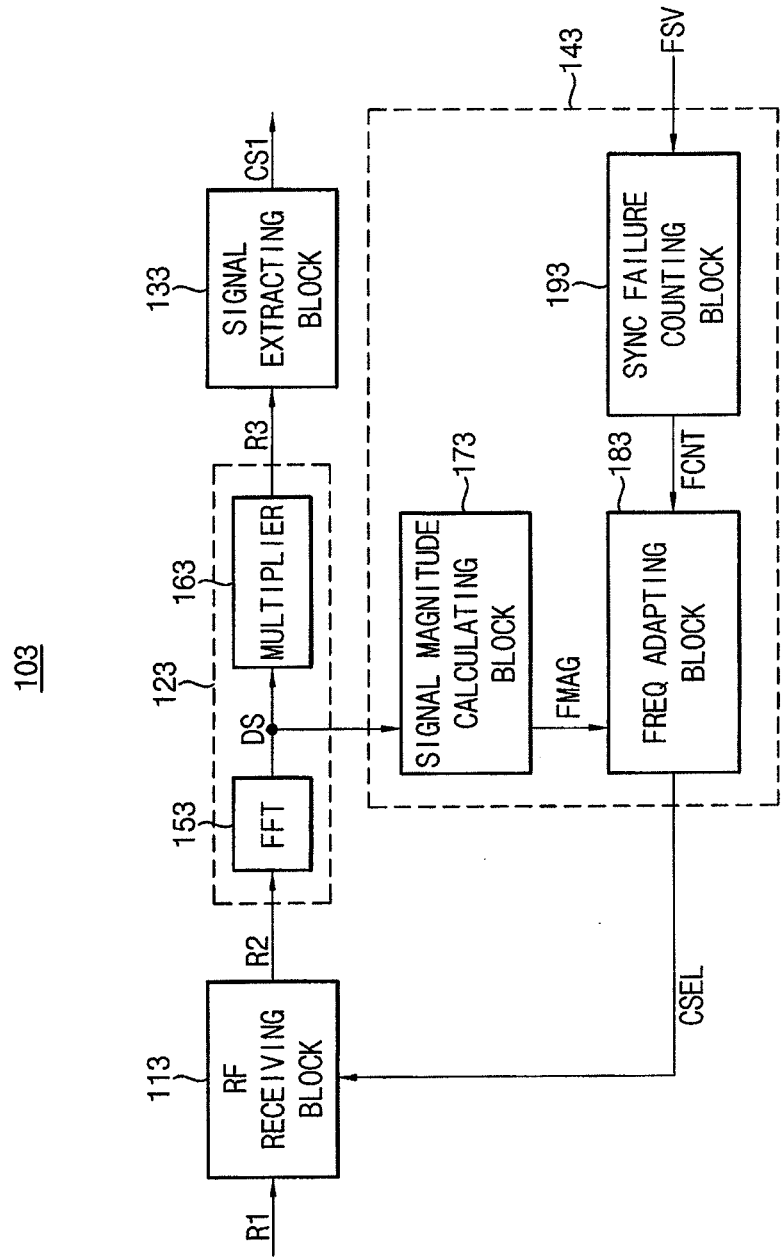
FIG. 12 is a block diagram of an example of the converting unit included in the control signal receiver of FIG. 11.

FIG. 12 is a block diagram of an example of the converting unit included in the control signal receiver of FIG. 11.

Referring to FIG. 12, the converting unit 103 includes a RF receiving block 113, a converting block 123, a signal extracting block 133 and the frequency adapting block 143.

The RF receiving block 113 receives the input signal R1. The RF receiving block 113 demodulates the input signal R1 based on the current carrier frequency to generate the demodulated signal R2.

According to the ISDB-T standard, ISDB-T system may include a plurality of channels. Each channel of ISDB-T system may be divided into thirteen OFDM segments. Each of the thirteen OFDM segments may have 428 kHz of bandwidth. The current carrier frequency may correspond to one of the thirteen OFDM segments.

The converting block 123 may include a fast Fourier transformer (FFT) 153 and a complex multiplier 163. The fast Fourier transformer 153 performs fast Fourier transform (FFT) on the demodulated signal R2 to generate the first complex symbol stream DS. The complex multiplier 163 performs complex conjugate multiplication of two consecutive complex symbols included in the first complex symbol stream DS to generate the second complex symbol stream R3. When the input signal R1 is an OFDM modulated signal, the first complex symbol stream DS may include OFDM symbols, and the second complex symbol stream R3 may include DBPSK symbols according to the ISDB-T standard.

The signal extracting block 133 may extract the complex control symbol stream CS1 from the second complex symbol stream R3. The complex control symbol stream CS1 may include transmission configurations. For example, the complex control symbol stream CS1 may include the TMCC signal.

The frequency adapting block 143 includes a signal magnitude calculating block 173, a frequency selecting block 183 and a synchronization failure counting block 193.

The signal magnitude calculating block 173 calculates magnitudes of frequency responses FMAG at frequencies of control carriers, which carry the transmission configurations, using the first complex symbol stream DS based on location information of the control carriers. For example, the control carriers may carry the TMCC signal. According to the ISDB-T standard, ISDB-T system may include a plurality of channels. Each channel of ISDB-T system may be divided into thirteen OFDM segments. Each of the thirteen OFDM segments may have a control carrier that carries the TMCC signal. The location information of the control carriers may include relative locations of the control carriers in the frequency domain in one of the first complex symbol stream. For example, the location information of the control carriers may include relative locations of the control carriers in the frequency domain among carriers included in an OFDM segment. Therefore, the signal magnitude calculating block 173 may calculate magnitudes of frequency responses FMAG at frequencies of the control carriers of OFDM segments based on the location information of the control carriers.

The synchronization failure counting block 193 receives the synchronization enable signal FSV from the synchronization decision block 233. The synchronization failure counting block 193 counts the number of frames during which the synchronization enable signal FSV is maintained in a deactivated state. The synchronization failure counting block 193 activates or deactivates an inner signal FCNT based on the counted number of frames. For example, the synchronization failure counting block 193 may deactivate the inner signal FCNT when the counted number of frames is less than N, and activate the inner signal FCNT when the counted number of frames is equal to or greater than N. The synchronization failure counting block 193 provides the inner signal FCNT to the frequency selecting block 183.

The frequency selecting block 183 selects a frequency of a control carrier having a maximum magnitude of frequency response. The frequency selecting block 183 generates the frequency selection signal CSEL based on the selected frequency of a control carrier. The frequency selecting block 183 provides the frequency selection signal CSEL to the RF receiving block 113 in response to the inner signal FCNT received from the synchronization failure counting block 193. For example, the frequency selecting block 183 may provide the frequency selection signal CSEL to the RF receiving block 113 when the inner signal FCNT is activated. As described above, the synchronization failure counting block 193 may activate the inner signal FCNT when the synchronization enable signal FSV is maintained in a deactivated state during more than N frames. Therefore, the frequency selecting block 183 provides the frequency selection signal CSEL to the RF receiving block 113 when (i.e., if, while) the synchronization enable signal FSV has been maintained in a deactivated state during more than N frames.

The RF receiving block 113 may adjust the current carrier frequency based on the frequency selection signal CSEL, so that the adjusted current carrier frequency corresponds to another OFDM segment. Therefore, the control signal receiver 13 may detect the synchronization word included in the TMCC signal and decode the TMCC information included in the TMCC signal correctly despite noise in the transmission channel.

Figure 13:
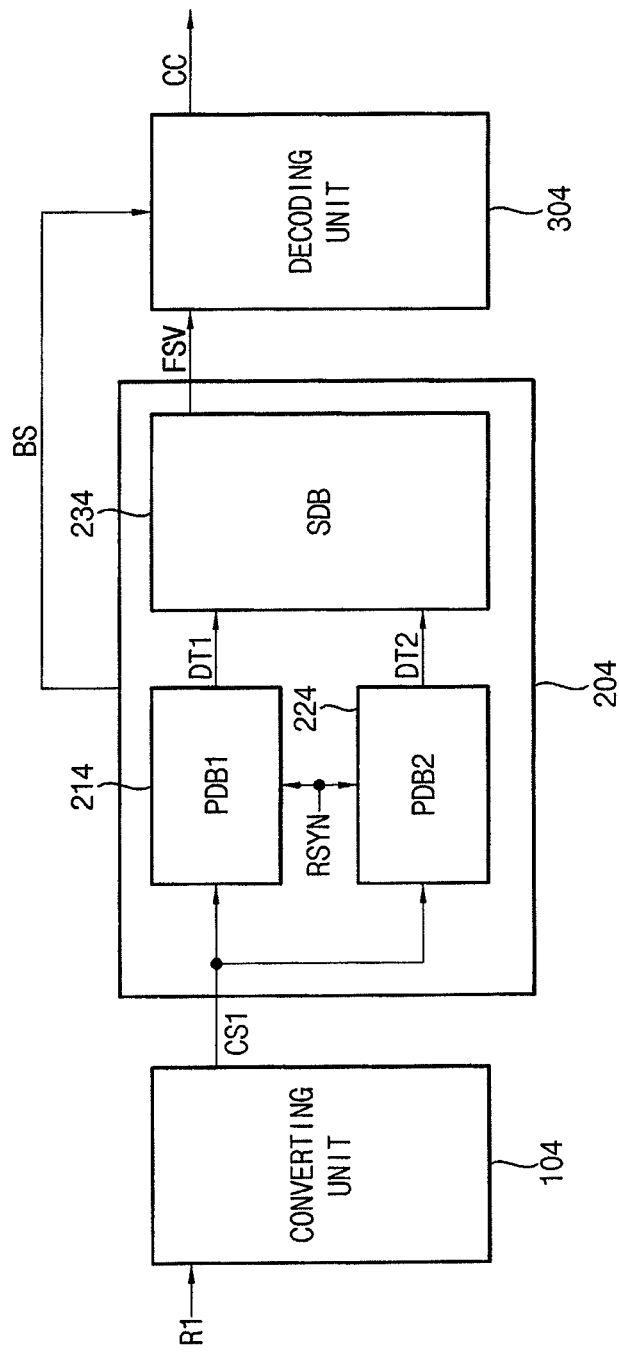
FIG. 13 is a block diagram of a control signal receiver according to exemplary embodiments.

FIG. 13 is a block diagram of a control signal receiver according to exemplary embodiments.

Referring to FIG. 13, a control signal receiver 14 includes a converting unit 104, a synchronization detection unit 204 and a decoding unit 304.

The converting unit 104 of FIG. 13 may have the same structure and operation as the converting unit 100 of FIG. 1. The structure and operation of the converting unit 100 are described above with reference to FIGS. 1 to 5. Therefore, a redundant detailed description of the converting unit 104 of FIG. 13 will be omitted.

The synchronization detection unit 204 of FIG. 13 may have the same structure and operation as the synchronization detection unit 200 of FIG. 1 except that the synchronization detection unit 204 further generates a control bit stream BS. The structure and operation of the synchronization detection unit 200 are described above with reference to FIGS. 1 to 5. Therefore, a redundant detailed description of the synchronization detection unit 204 of FIG. 13 will be omitted except for the generation of the control bit stream BS.

The synchronization detection unit 204 outputs one of the first bit stream generated by the first pattern detection block 214 and the second bit stream generated by the second pattern detection block 224 as the control bit stream BS. The synchronization detection unit 204 provides the control bit stream BS to the decoding unit 304.

The decoding unit 304 may generate a transmission configuration signal CC by decoding the control bit stream BS based on the synchronization enable signal FSV. For example, the decoding unit 304 may decode the control bit stream BS to generate the transmission configuration signal CC including the transmission configurations when the synchronization enable signal FSV is activated. When the control signal receiver 14 receives the TMCC signal according to the ISDB-T standard, the transmission configuration signal CC may include three bits of segment descriptor, two bits of system descriptor, four bits of count down index, one bit of switch-on control flag used for alert broadcasting, one bit of transmission segment identification, thirteen bits of transmission parameters for layer A, thirteen bits of transmission parameters for layer B, thirteen bits of transmission parameters for layer C, one bit of transmission segment identification for next configuration, thirteen bits of transmission parameters for layer A for next configuration, thirteen bits of transmission parameters for layer B for next configuration, thirteen bits of transmission parameters for layer C for next configuration, eighty two parity bits, etc. Each of the thirteen bits of transmission parameters may include three bits of modulation parameter, three bits of code rate parameter, three bits of time interleaving parameter and four bits of number of segments parameters.

Figure 14:
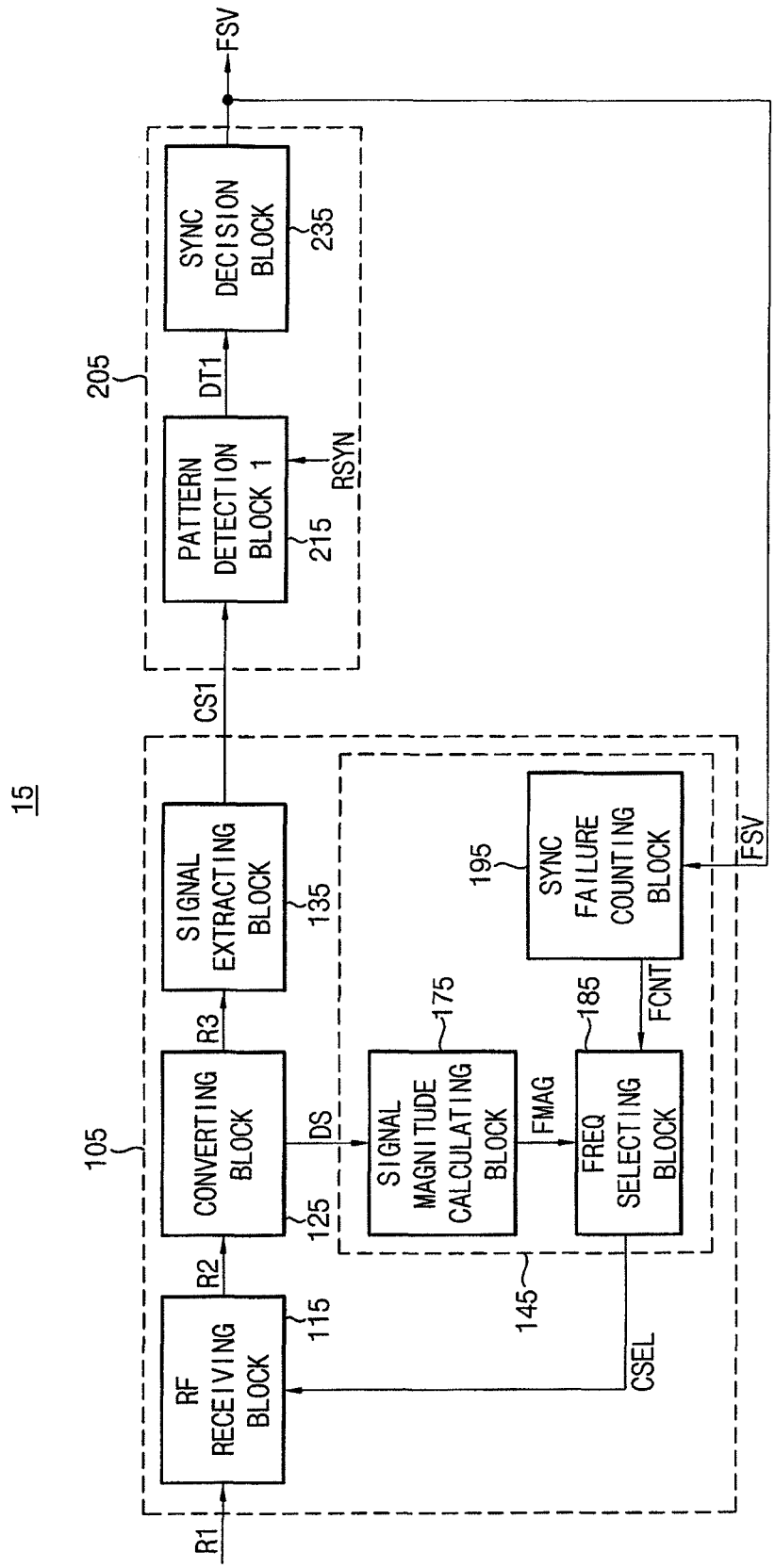
FIG. 14 is a block diagram of a control signal receiver according to exemplary embodiments.

FIG. 14 is a block diagram of a control signal receiver according to exemplary embodiments.

Referring to FIG. 14, a control signal receiver 15 includes a converting unit 105 and a synchronization detection unit 205.

The converting unit 105 of FIG. 14 may have the same structure and operation as the converting unit 103 of FIG. 11. The structure and an operation of the converting unit 103 are described above with reference to FIGS. 11 and 12. Therefore, a redundant detailed description of the converting unit 105 of FIG. 14 will be omitted.

Comparing the synchronization detection unit 205 of FIG. 14 with the synchronization detection unit 200 of FIG. 1, the synchronization detection unit 205 does not include the second pattern detection block 210.

Thus, the synchronization detection unit 205 includes a first pattern detection block 215 and a synchronization decision block 235.

The first pattern detection block 215 of FIG. 14 may have the same structure and operation as the first pattern detection block 210 of FIG. 1. The structure and operation of the first pattern detection block 210 are described above with reference to FIGS. 1 to 5. Therefore, a redundant detailed description of the first pattern detection block 215 of FIG. 14 will be omitted.

The synchronization decision block 235 outputs the first synchronization signal DT1 as the synchronization enable signal FSV. The synchronization decision block 235 provides the synchronization enable signal FSV to the synchronization failure counting block 195.

Figure 15:
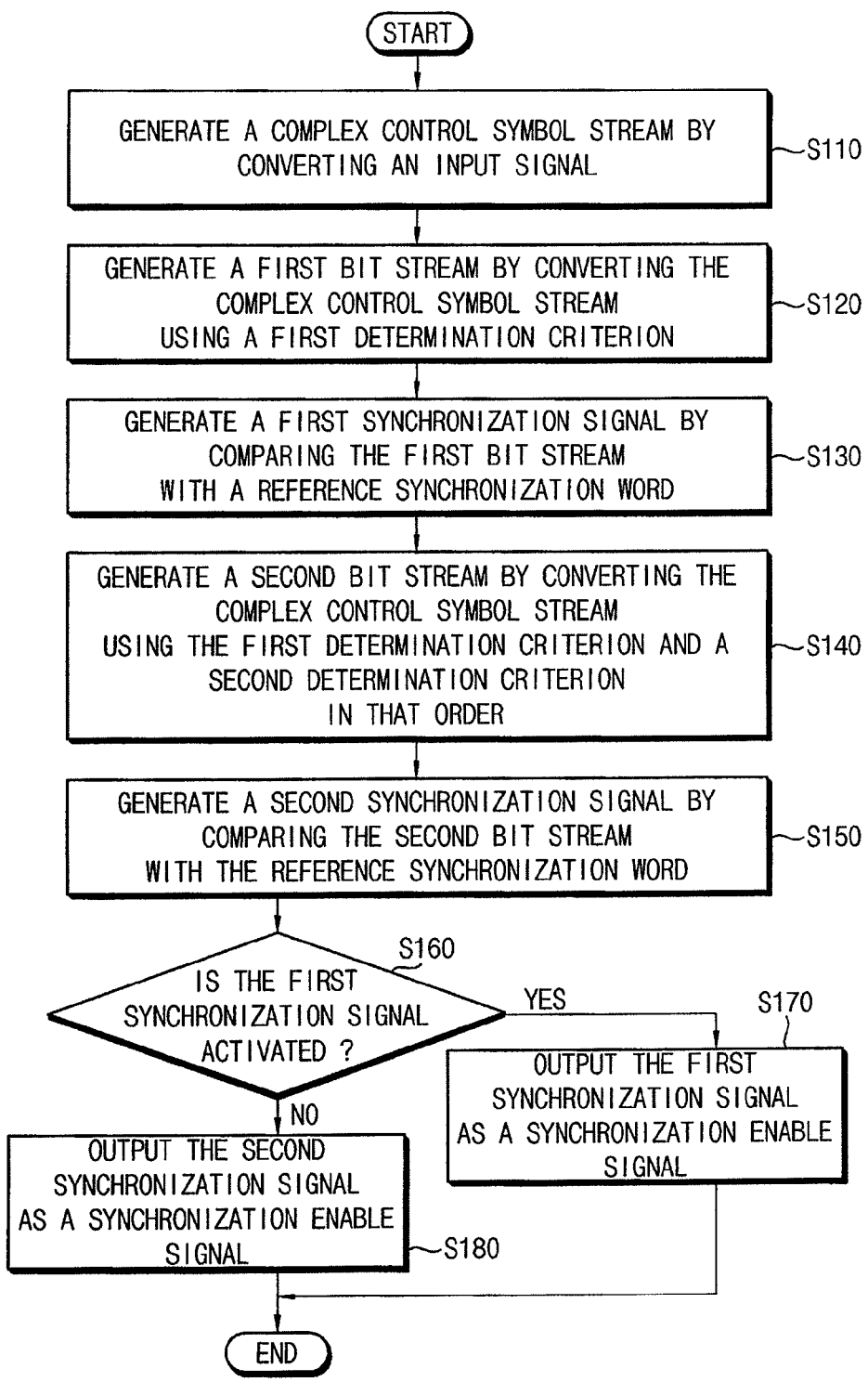
FIG. 15 is a flow chart illustrating a method of receiving a control signal according to exemplary embodiments.

FIG. 15 is a flow chart illustrating a method of receiving a control signal according to exemplary embodiments.

The method of receiving a control signal of FIG. 15 may be performed by any of the control signal receivers 10, 11, 12, 13, 14 of FIGS. 1, 6, 8, 11 and 13.

Referring to FIGS. 1 to 15, the converting unit (100, 101, 102, 103, 104) receives the input signal R1 and generates the complex control symbol stream CS1 including the transmission configurations by converting the input signal R1 (step S110).

The first pattern detection block (210, 211, 212, 213, 214) generates the first bit stream by converting the complex control symbol stream CS1 using the first determination criterion (step S120). The first pattern detection block (210, 211, 212, 213, 214) generates the first synchronization signal DT1 by comparing the first bit stream with the reference synchronization word RSYN (step S130).

The second pattern detection block (220, 221, 222, 223, 224) generates the second bit stream by converting the complex control symbol stream CS1 using the first determination criterion and the second determination criterion in that order (step S140). The second pattern detection block (220, 221, 222, 223, 224) generates the second synchronization signal DT2 by comparing the second bit stream with the reference synchronization word RSYN (step S150).

The synchronization decision block (230, 231, 232, 233, 234) determines whether the first synchronization signal DT1 is activated (decision step S160). While activated (YES branch of decision step S160), the synchronization decision block (230, 231, 232, 233, 234) outputs the first synchronization signal DT1 as the synchronization enable signal FSV when the first synchronization signal DT1 is activated (step S170). While not activated (NO branch of decision step S160), the synchronization decision block (230, 231, 232, 233, 234) outputs the second synchronization signal DT2 as the synchronization enable signal FSV when the first synchronization signal DT1 is deactivated (step S180).

Figure 16:
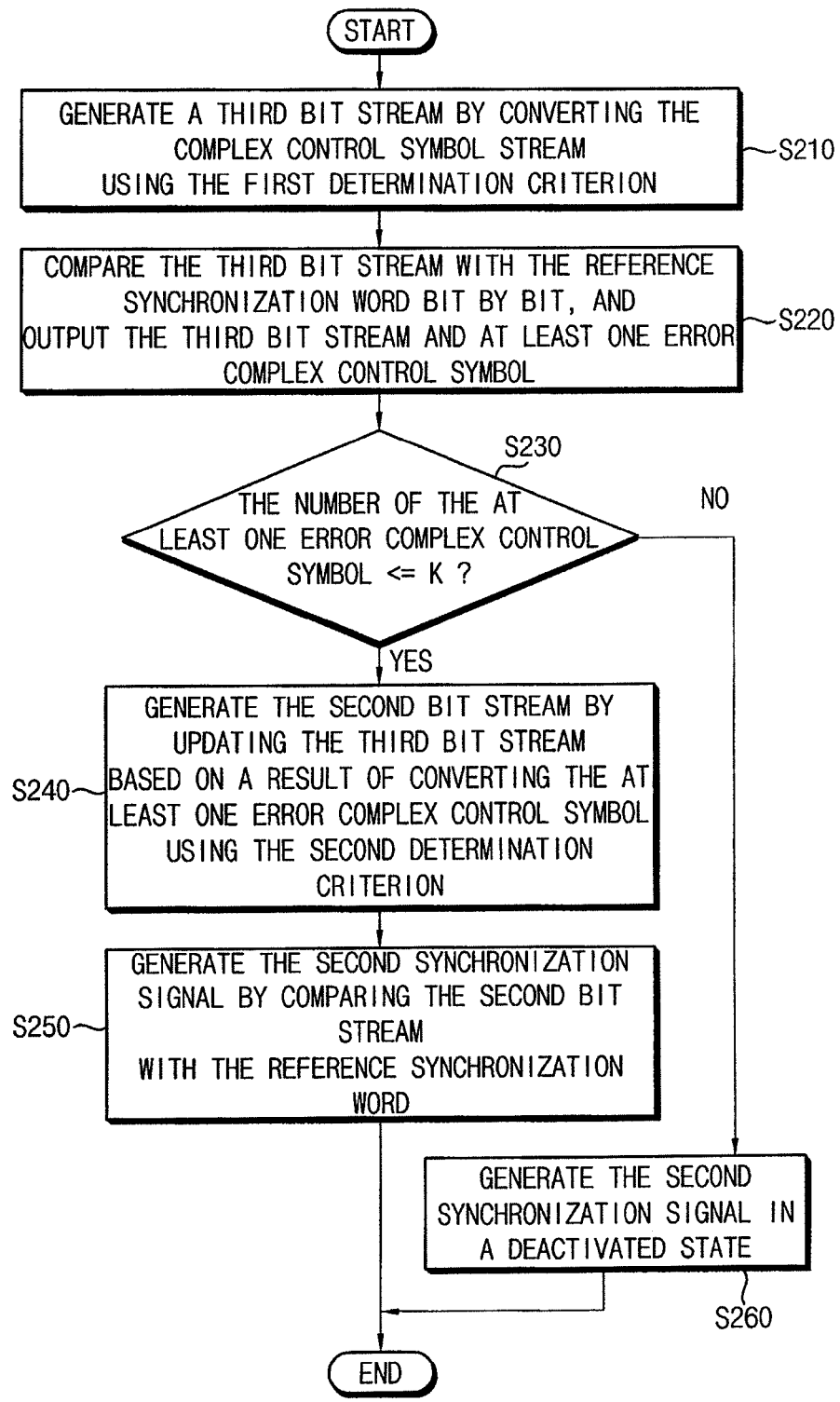
FIG. 16 is a flow chart for describing step S140 and step S150 the method of FIG. 15.

FIG. 16 is a flow chart for describing step S140 and step S150 of the method of FIG. 15.

The step S140 and step S150 of FIG. 15 may be performed by the second pattern detection block 220, 221, 222, 223, 224 of FIGS. 1, 6, 8, 11 and 13.

Referring to FIGS. 1 to 16, the first sub-detection block 240 included in the second pattern detection block 220, 221, 222, 223, 224 generates the third bit stream S3 by converting the complex control symbol stream CS1 using the first determination criterion (step S210). The first sub-detection block 240 compares the third bit stream S3 with the reference synchronization word RSYN bit by bit, and outputs the third bit stream S3 and at least one complex control symbol among the complex control symbol stream CS1, which corresponds to a bit of the third bit stream S3 that does not coincide with the reference synchronization word RSYN, as the at least one error complex control symbol ER (step S220).

The second sub-detection block 250 determines whether the number of error complex control symbol(s) ER is equal to or smaller than K (decision step S230). While the number of error complex control symbol(s) ER is greater than K (NO branch of decision step S230) then the second sub-detection block 250 generates the second synchronization signal DT2 in a deactivated state (S260). When the number of error complex control symbol(s) is equal to or less than K (YES branch of decision step S230), the second sub-detection block 250 generates the second bit stream by updating the third bit stream S3 based on the result of converting the at least one error complex control symbol ER using the second determination criterion (step S240). The second sub-detection block 250 generates the second synchronization signal DT2 by comparing the second bit stream with the reference synchronization word (step S250).

Figure 17:
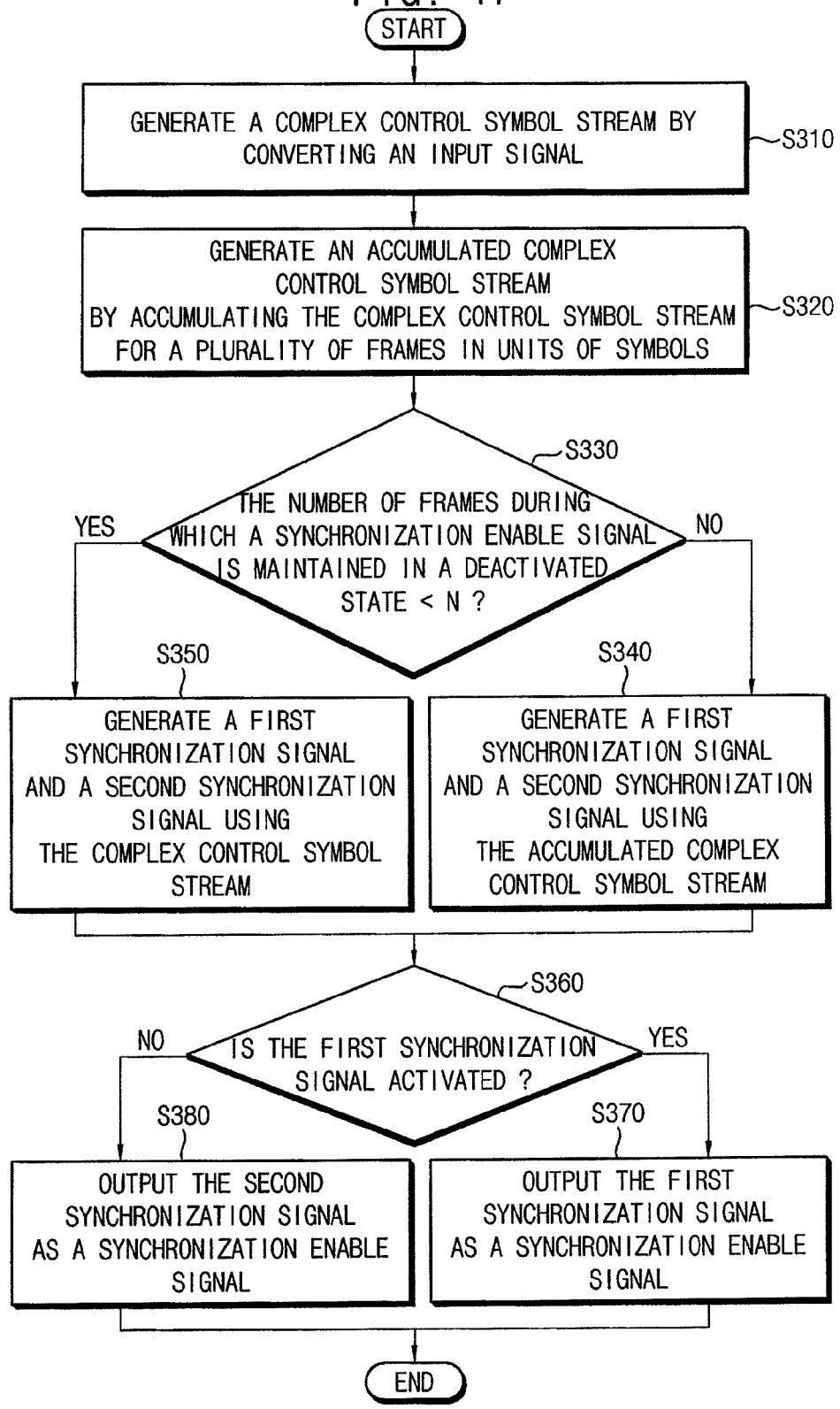
FIG. 17 is a flow chart illustrating a method of receiving a control signal according to exemplary embodiments.

FIG. 17 is a flow chart illustrating a method of receiving a control signal according to exemplary embodiments.

The method of receiving a control signal of FIG. 17 may be performed by the control signal receiver 11 of FIG. 6.

Referring to FIGS. 6 and 17, the converting unit 101 receives the input signal R1 and generates the complex control symbol stream CS1 including the transmission configurations by converting the input signal R1 (step S310).

The accumulating block 271 generates an accumulated complex control symbol stream ACS by accumulating the complex control symbol stream CS1 for a plurality of frames in units of symbols (step S320).

The counting block 291 included in the synchronization decision block 231 counts the number of frames during which the synchronization enable signal FSV is maintained in a deactivated state. The synchronization decision block 231 determines whether the counted number of frames is smaller than N (decision step S330). When (while) the counted number of frames is smaller than N (YES branch of decision step S330), the synchronization decision block 231 deactivates the inner signal CNT. When (while) the counted number of frames is equal to or greater than N (NO branch of decision step 15330) the synchronization decision block 231 activates the inner signal CNT.

The multiplexer 281 provides the accumulated complex control symbol stream ACS to the first pattern detection block 211 and the second pattern detection block 221 when the inner signal CNT is activated. The first pattern detection block 211 and the second pattern detection block 221 generates the first synchronization signal DT1 and the second synchronization signal DT2, respectively, using the accumulated complex control symbol stream ACS (step S340).

The multiplexer 281 provides the complex control symbol stream CS1 to the first pattern detection block 211 and the second pattern detection block 221 when the inner signal CNT is deactivated. The first pattern detection block 211 and the second pattern detection block 221 generates the first synchronization signal DT1 and the second synchronization signal DT2, respectively, using the complex control symbol stream CS1 (step S350).

The synchronization decision block 231 determines whether the first synchronization signal DT1 is activated (decision step S360). When the first synchronization signal DT1 is activated, the synchronization decision block 231 outputs the first synchronization signal DT1 as the synchronization enable signal FSV (step S370). When the first synchronization signal DT1 is deactivated, the synchronization decision block 231 outputs the second synchronization signal DT2 as the synchronization enable signal FSV (step S380).

Figure 18:
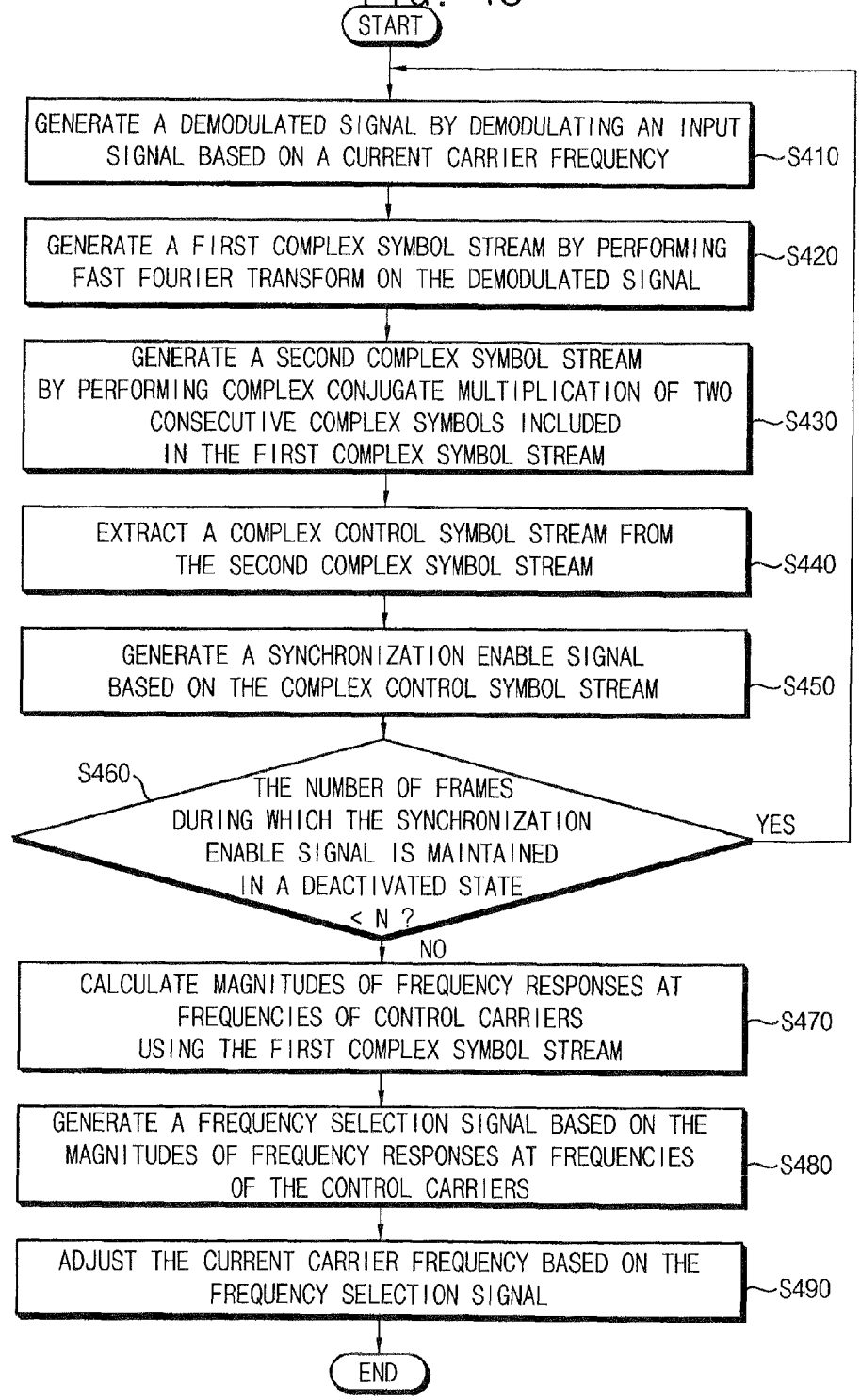
FIG. 18 is a flow chart illustrating a method of receiving a control signal according to exemplary embodiments.

FIG. 18 is a flow chart illustrating a method of receiving a control signal according to exemplary embodiments.

The method of receiving a control signal of FIG. 18 may be performed by the control signal receiver 13, 15 of FIGS. 11 and 14.

The RF receiving block 113, 115 generates the demodulated signal R2 by demodulating the input signal R1 based on the current carrier frequency (step S410).

The fast Fourier transformer (FFT) 153, 155 generates the first complex symbol stream DS by performing fast Fourier transform (FFT) on the demodulated signal R2 (step S420).

The complex multiplier 163, 165 generates the second complex symbol stream R3 by performing complex conjugate multiplication of two consecutive complex symbols included in the first complex symbol stream DS (step S430).

The signal extracting block 133, 135 extracts the complex control symbol stream CS1 from the second complex symbol stream R3 (step S440).

The synchronization detection unit 203, 205 generates the synchronization enable signal FSV based on the complex control symbol stream CS1 (step S450).

The synchronization failure counting block 193, 195 counts the number of frames during which the synchronization enable signal FSV is maintained in a deactivated state. The synchronization failure counting block 193, 195 determines whether the counted number of frames is smaller than N (decision step S460). The synchronization failure counting block 193, 195 deactivates the inner signal FCNT when the counted number of frames is smaller than N, and activate the inner signal FCNT when the counted number of frames is equal to or greater than N.

When the counted number of frames is smaller than N (YES branch of decision step S460), the step S410, the step S420, the step S430, the step S440, the step S450 and the decision step S460 are performed again.

When the counted number of frames is equal to or greater than N (NO branch of decision step S460), the signal magnitude calculating block 173, 175 calculates magnitudes of frequency responses FMAG at frequencies of control carriers, which carry the transmission configurations, using the first complex symbol stream DS based on the location information of the control carriers (step S470).

The frequency selecting block 183, 185 selects the frequency of a control carrier having a maximum magnitude of frequency response and generates the frequency selection signal CSEL based on the selected frequency of a control carrier (step S480).

The RF receiving block 113, 115 adjusts the current carrier frequency based on the frequency selection signal CSEL (S490).

Figure 19:
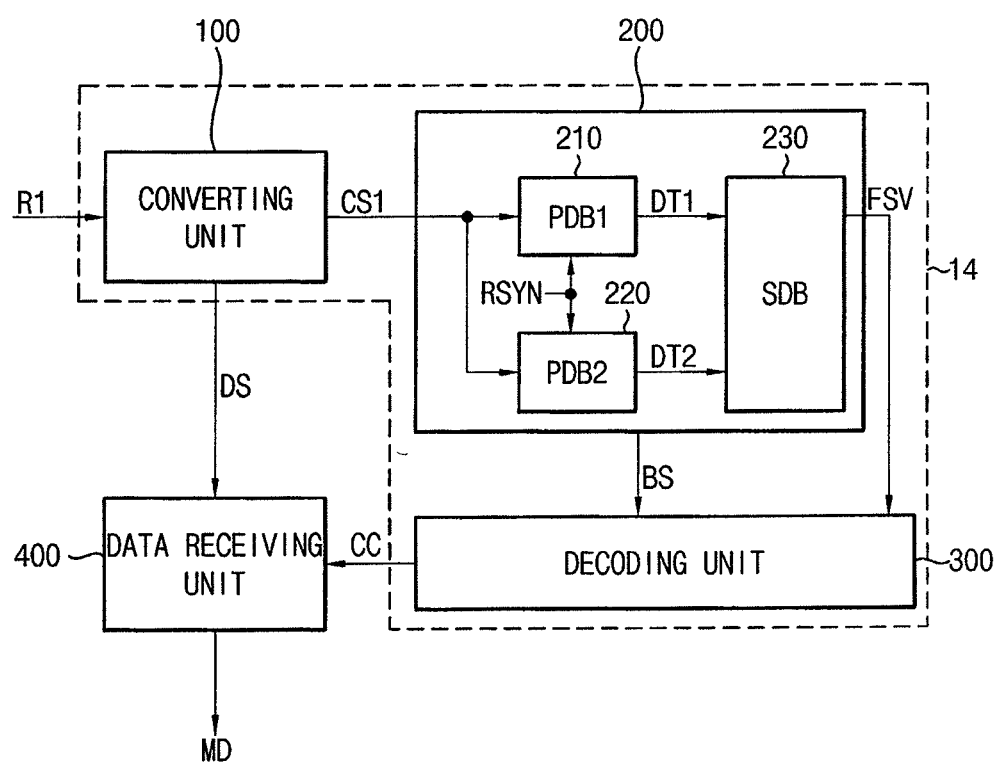
FIG. 19 is a block diagram of a communication device according to exemplary embodiments.

FIG. 19 is a block diagram of a communication device according to exemplary embodiments.

Referring to FIG. 19, a communication device 1000 includes the control signal receiver 14 and a data receiving unit 400.

The control signal receiver 14 may be implemented as the control signal receiver 14 of FIG. 13. The structure and an operation of the control signal receiver 14 of FIG. 13 are described above with reference to FIGS. 1 to 14. Therefore, a redundant detailed description of the control signal receiver 14 of FIG. 19 will be omitted.

The data receiving unit 400 receives the first complex symbol stream DS from the converting unit 100 and receives the transmission configuration signal CC from the decoding unit 300. The data receiving unit 400 generates multimedia data MD by decoding the first complex symbol stream DS based on the transmission configuration signal CC. For example, the data receiving unit 400 may generate a complex data symbol stream by extracting complex symbols having a multimedia signal from the first complex symbol stream DS, and may generate the multimedia data MD by converting the complex data symbol stream.

Figure 20:
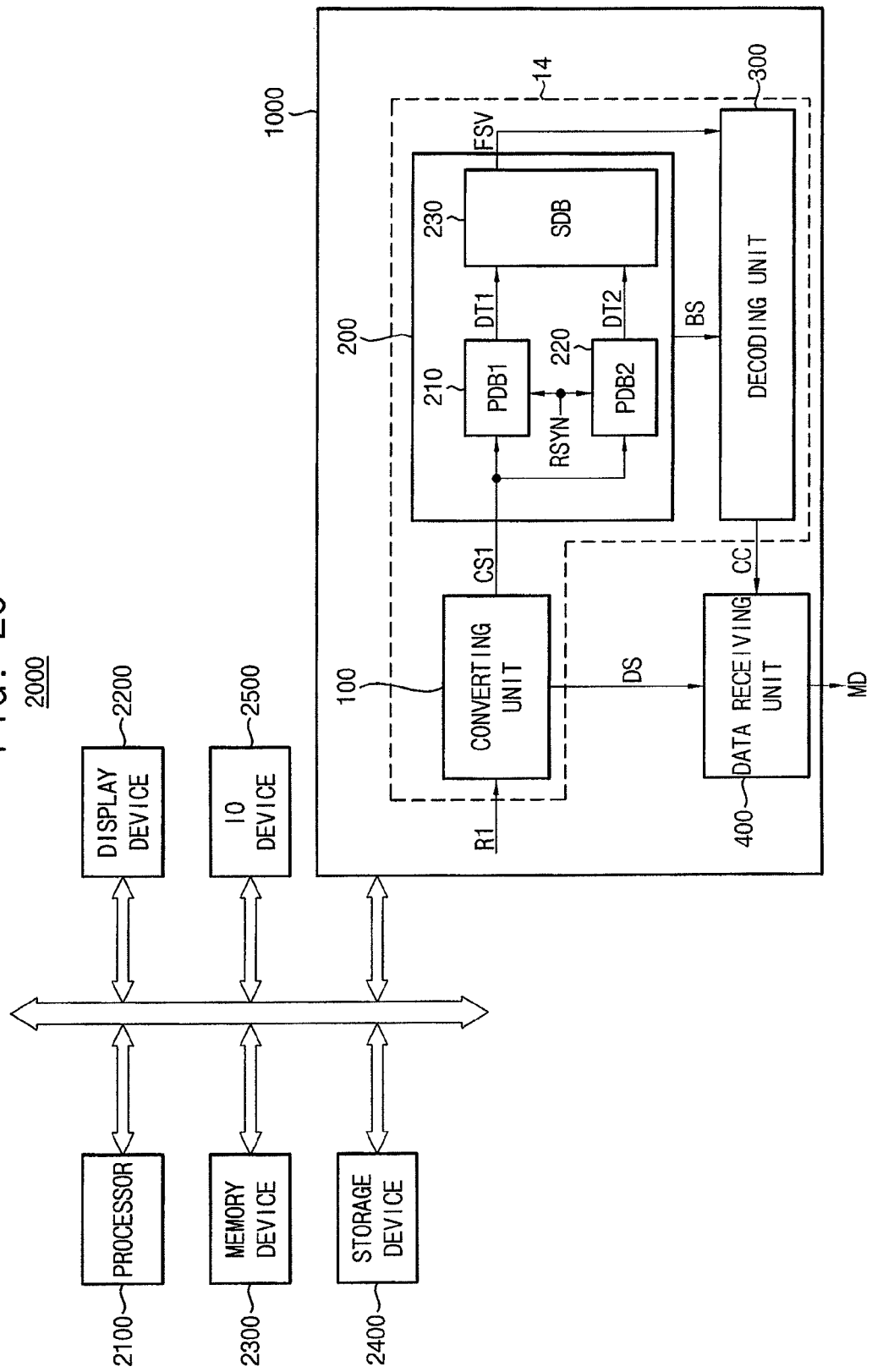
FIG. 20 is a block diagram of a system according to exemplary embodiments.

FIG. 20 is a block diagram of a system according to exemplary embodiments.

Referring to FIG. 20, the system 2000 includes a communication device 1000, a processor 2100 and a display device 2200.

The communication device 1000 receives an input signal R1 through a fading channel. The communication device 1000 generates multimedia data MD by converting the input signal R1. The communication device 1000 may be implemented as the communication device 1000 of FIG. 19. The structure and operation of the communication device 1000 of FIG. 19 are described above with reference to FIGS. 1 to 19. Therefore, a redundant detailed description of the communication device 1000 of FIG. 20 will be omitted.

The processor 2100 controls the operation of the communication device 1000 and the display device 2200. For example, the processor 2100 may receive the multimedia data MD from the communication device 1000 and provide the multimedia data MD to the display device 2200.

The display device 2200 displays the multimedia data MD.

The processor 2100 may perform various computing functions, such as executing specific software for performing specific calculations or tasks. The processor 2100 may be a microprocessor or a central processing unit (CPU). The processor 2100 may be connected to the display device 2200 and the communication device 1000 via a bus. The processor 2100 may be connected to an extended bus, such as peripheral component interconnect (PCI) bus.

The processor 2100 may be embodied with a single core architecture or with a multi core architecture. For example, the processor 2100 may be embodied as a single core architecture when the operating frequency of the processor 2100 is less than 1 GHz, and the processor 2100 may be embodied as a multi core architecture when an operating frequency of the processor 2100 is greater than 1 GHz. The processor 2100 embodied as a multi core architecture may communicate with peripheral devices via an advanced extensible interface (AXI) bus.

The system 2000 may further include a random-access memory device (RAM) 2300, a non-volatile storage device 2400 and an input/output device 2500. Although not illustrated in FIG. 20, the system 2000 may further include ports to communicate with a video card, a sound card, a memory card, a universal serial bus (USB) device, etc.

The storage device 2400 may be configured to store the multimedia data MD. The storage device 2400 may include a solid state drive (SSD), a hard disk drive (HDD), a compact disk read-only memory (CD-ROM) drive, etc.

The memory device 2300 may be configured to store data and/or executable code required for the operation of the system 2000. The memory device 2300 may be a volatile memory such as a dynamic random access memory (DRAM), a static random access memory (SRAM), etc., and may include a non-volatile memory such as an erasable programmable read-only memory (EPROM), an electrically erasable programmable read-only memory (EEPROM), a flash memory, etc.

The input/output device 2500 may include an input device (e.g., a keyboard or a mouse) and an output device (e.g., a printer).

The system 2000 may be a mobile device, a smart phone, a cellular phone, a desktop computer, a laptop computer, a notebook, a tablet PC, a work station, a handheld device, or the like.

The foregoing is illustrative of the present inventive concept and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A control signal receiver, comprising:
    a converting circuit configured to convert an input signal and to generate a complex control symbol stream including transmission configurations; and
    a synchronization detection circuit configured to:
        generate a first bit stream by applying a first determination criterion to the complex control symbol stream, and to
        generate a first synchronization signal by comparing the first bit stream with a reference synchronization word, and to
        generate a second bit stream by applying the first determination criterion to the complex control symbol stream and a second determination criterion in that order, and to
        generate a second synchronization signal by comparing the second bit stream with the reference synchronization word, and to
        output one of the first synchronization signal and the second synchronization signal as a synchronization enable signal,
    wherein the synchronization detection circuit comprises:
        a first pattern detection block configured to convert the complex control symbol stream using the first determination criterion to generate the first bit stream and configured to generate the first synchronization signal by comparing the first bit stream with the reference synchronization word;
        a second pattern detection block configured to convert the complex control symbol stream using the first determination criterion to generate a third bit stream and configured to generate at least one error complex control symbol when the third bit stream does not include the reference synchronization word, and configured to generate the second bit stream by applying the second determination criterion to the at least one error complex control symbol and configured to generate the second synchronization signal by comparing the second bit stream with the reference synchronization word; and
        a synchronization decision block configured to output one of the first synchronization signal and the second synchronization signal as the synchronization enable signal.

2. The control signal receiver of claim 1, wherein the second pattern detection block comprises:
    a first sub-detection block configured to convert the complex control symbol stream using the first determination criterion to generate the third bit stream, and configured to compare the third bit stream with the reference synchronization word bit by bit, and configured to output the third bit stream and at least one error complex control symbol that corresponds to a bit of the third bit stream that does not coincide with the reference synchronization word; and
    a second sub-detection block configured to generate the second bit stream by updating the third bit stream based on a result of converting the at least one error complex control symbol using the second determination criterion and configured to generate the second synchronization signal by comparing the second bit stream with the reference synchronization word.

3. The control signal receiver of claim 1, wherein the synchronization decision block outputs the first synchronization signal as the synchronization enable signal while the first synchronization signal is activated, and outputs the second synchronization signal as the synchronization enable signal while the first synchronization signal is deactivated.

4. The control signal receiver of claim 1, wherein the synchronization decision block:
    outputs the first synchronization signal as the synchronization enable signal during a first period having a length of M (M is a positive integer) frames,
    outputs the first synchronization signal as the synchronization enable signal after the first period if the first synchronization signal was activated during the first period, and
    outputs the second synchronization signal as the synchronization enable signal after the first period if the first synchronization signal was maintained in a deactivated state during the first period.

5. The control signal receiver of claim 1, wherein the synchronization detection circuit further comprises:
    an accumulating block configured to generate an accumulated complex control symbol stream by accumulating the complex control symbol stream for a plurality of frames in units of symbols; and
    a multiplexer configured to provide a selected one of the accumulated complex control symbol stream and the complex control symbol stream to the first pattern detection block and to the second pattern detection block, in response to a selection signal.

6. The control signal receiver of claim 5, wherein the selection signal is activated while the synchronization enable signal has been maintained in a deactivated state during N (N is a positive integer) frames, and
    wherein the multiplexer provides the accumulated complex control symbol stream to the first pattern detection block and to the second pattern detection block while the selection signal is activated and provides the complex control symbol stream to the first pattern detection block and to the second pattern detection block while the selection signal is deactivated.

7. The control signal receiver of claim 5, wherein the reference synchronization word is inverted in every frame, and
wherein the accumulating block generates the accumulated complex control symbol stream by inverting the accumulated complex control symbol stream and adding the complex control symbol stream to the inverted accumulated complex control symbol stream in every frame.

8. The control signal receiver of claim 1, wherein the first determination criterion includes a first area and a second area that do not overlap each other in a complex number plane, a complex control symbol included in the complex control symbol stream being converted into a bit of '1' if the complex control symbol is included in the first area and being converted into a bit of '0' if the complex control symbol is included in the second area, and
wherein the second determination criterion includes a third area and a fourth area that overlap each other in the complex number plane, the complex control symbol being converted into one of a bit of '1' and a bit of '0' according to which area selected among the third area and the fourth area is used if the complex control symbol is included in an overlapping area of the third area and the fourth area.

9. A control signal receiver, comprising:
a converting circuit configured to convert an input signal and to generate a complex control symbol stream including transmission configurations; and
a synchronization detection circuit configured to:
generate a first bit stream by applying a first determination criterion to the complex control symbol stream, and to
generate a first synchronization signal by comparing the first bit stream with a reference synchronization word, and to
generate a second bit stream by applying the first determination criterion to the complex control symbol stream and a second determination criterion in that order, and to
generate a second synchronization signal by comparing the second bit stream with the reference synchronization word, and to
output one of the first synchronization signal and the second synchronization signal as a synchronization enable signal,
wherein the converting circuit comprises:
a radio frequency (RF) receiving block configured to demodulate the input signal based on a current carrier frequency to generate a demodulated signal, the RF receiving block adjusting the current carrier frequency based on a frequency selection signal;
a converting block configured to perform fast Fourier transform on the demodulated signal to generate a first complex symbol stream, and to perform complex conjugate multiplication of two consecutive complex symbols included in the first complex symbol stream to generate a second complex symbol stream;
a signal extracting block configured to extract the complex control symbol stream from the second complex symbol stream; and
a frequency adapting block configured to calculate magnitudes of frequency responses at frequencies of control carriers that carry the transmission configurations, using the first complex symbol stream based on location information of the control carriers, and to generate the frequency selection signal based on the calculated magnitudes of frequency responses at frequencies of the control carriers;
wherein the frequency adapting block provides the frequency selection signal to the RF receiving block when the synchronization enable signal is maintained in a deactivated state during N (N is a positive integer) frames.

10. The control signal receiver of claim 9, wherein the location information of the control carriers includes relative locations of the control carriers in a frequency domain in one of the first complex symbol stream.

11. A control signal receiver, comprising:
a converting circuit configured to convert an input signal and to generate a complex control symbol stream including transmission configurations; and
a synchronization detection circuit configured to:
generate a first bit stream by applying a first determination criterion to the complex control symbol stream, and to
generate a first synchronization signal by comparing the first bit stream with a reference synchronization word, and to
generate a second bit stream by applying the first determination criterion to the complex control symbol stream and a second determination criterion in that order, and to
generate a second synchronization signal by comparing the second bit stream with the reference synchronization word, and to
output one of the first synchronization signal and the second synchronization signal as a synchronization enable signal; and
a decoding circuit configured to generate a transmission configuration signal by decoding a control bit stream based on the synchronization enable signal,
wherein the synchronization detection circuit provides one of the first bit stream and the second bit stream to the decoding circuit as the control bit stream.

12. The control signal receiver of claim 11, wherein the input signal is an orthogonal frequency division multiplexing (OFDM) modulated signal, and
wherein each complex symbol included in the complex control symbol stream is a differential binary phase shift keying (DBPSK) symbol.

13. A communication device, comprising:
a converting circuit configured to generate a complex symbol stream by converting an input signal, and to extract a complex control symbol stream including transmission configurations from the complex symbol stream;
a synchronization detection circuit configured to
generate a first bit stream by applying a first determination criterion to the complex control symbol stream and to
generate a first synchronization signal by comparing the first bit stream with a reference synchronization word, the synchronization detection circuit generating a second bit stream by applying the first determination criterion to the complex control symbol stream and a second determination criterion in that order and to
generate a second synchronization signal by comparing the second bit stream with the reference synchronization word, the synchronization detection circuit outputting one of the first synchronization signal and the second synchronization signal as a synchronization enable signal, and to
output one of the first bit stream and the second bit stream as a control bit stream;

a decoding circuit configured to generate a transmission configuration signal by decoding the control bit stream based on the synchronization enable signal;

a data receiving circuit configured to generate multimedia data by decoding the complex symbol stream based on the transmission configuration signal; and wherein the synchronization detection circuit comprises:

a first pattern detection block configured to convert the complex control symbol stream using the first determination criterion to generate the first bit stream and configured to generate the first synchronization signal by comparing the first bit stream with the reference synchronization word;

a second pattern detection block configured to convert the complex control symbol stream using the first determination criterion to generate a third bit stream and configured to generate at least one error complex control symbol when the third bit stream does not include the reference synchronization word, and configured to generate the second bit stream by applying the second determination criterion to the at least one error complex control symbol and configured to generate the second synchronization signal by comparing the second bit stream with the reference synchronization word; and a synchronization decision block configured to output one of the first synchronization signal and the second synchronization signal as the synchronization enable signal.

14. The communication device of claim 13, wherein the converting circuit comprises:

a radio frequency (RF) receiving block configured to demodulate the input signal based on a current carrier frequency to generate a demodulated signal, the RF receiving block adjusting the current carrier frequency based on a frequency selection signal;

a converting block configured to perform fast Fourier transform on the demodulated signal to generate a first complex symbol stream, and to perform complex conjugate multiplication of two consecutive complex symbols included in the first complex symbol stream to generate a second complex symbol stream;

a signal extracting block configured to extract the complex control symbol stream from the second complex symbol stream; and a frequency adapting block configured to calculate magnitudes of frequency responses at frequencies of control carriers that carry the transmission configurations, using the first complex symbol stream based on location information of the control carriers, and to generate the frequency selection signal based on the calculated magnitudes of frequency responses at frequencies of the control carriers.

15. The communication device of claim 13, wherein the communication device is operatively connected to a processor configured to receive multimedia data from the communication device and to a display device configured to display the multimedia data.

16. The communication device of claim 15, wherein the processor is operatively connected to a random-access memory (RAM), a non-volatile storage device and an input/output device.

* * * * *